United States Patent
Stolte et al.

(10) Patent No.: US 10,607,014 B1
(45) Date of Patent: Mar. 31, 2020

(54) DETERMINING MONETARY LOSS DUE TO SECURITY RISKS IN A COMPUTER SYSTEM

(71) Applicant: CA, INC., San Jose, CA (US)

(72) Inventors: Ryan G. Stolte, New York, NY (US); Firas S. Rifai, San Francisco, CA (US); Humphrey Christian, Oakland, CA (US); Joseph Anthony DeRobertis, Altadena, CA (US); Shmuel Yehonatan Green, New York, NY (US)

(73) Assignee: CA, In., San Jose, CA (US)

( * ) Notice: Subject to any disclaimer, the term of this patent is extended or adjusted under 35 U.S.C. 154(b) by 48 days.

(21) Appl. No.: 15/836,794

(22) Filed: Dec. 8, 2017

Related U.S. Application Data

(60) Provisional application No. 62/505,087, filed on May 11, 2017, provisional application No. 62/505,091, filed on May 11, 2017, provisional application No. 62/505,096, filed on May 11, 2017, provisional application No. 62/505,099, filed on May 11, 2017.

(51) Int. Cl.
  *G06F 21/57* (2013.01)
  *G06Q 10/06* (2012.01)
(52) U.S. Cl.
  CPC ....... *G06F 21/577* (2013.01); *G06Q 10/0635* (2013.01); *G06F 2221/034* (2013.01)
(58) Field of Classification Search
  CPC ............ G06F 21/577; G06F 2221/034; G06Q 10/0635
  See application file for complete search history.

(56) References Cited

U.S. PATENT DOCUMENTS

| | | | |
|---|---|---|---|
| 6,907,531 B1 | 6/2005 | Dodd et al. | |
| 7,114,183 B1 | 9/2006 | Joiner | |
| 7,293,287 B2 | 11/2007 | Fischman et al. | |
| 7,325,252 B2 | 1/2008 | Bunker et al. | |
| 7,665,119 B2 | 2/2010 | Bezilla et al. | |
| 7,698,148 B2 | 4/2010 | Lavu et al. | |

(Continued)

OTHER PUBLICATIONS

Eli Weintraub, "Evaluating Confidentiality Impact in Security Risk Scoring Models", (IJACSA) International Journal of Advanced Computer Science and Applications, vol. 7, No. 12, 2016. (Year: 2016).*

(Continued)

*Primary Examiner* — Chau Le
(74) *Attorney, Agent, or Firm* — FisherBroyles, LLP

(57) ABSTRACT

A method of determining a monetary loss due to security risks associated with a plurality of applications executing on a plurality of computers in a computer system is provided. The method assigns a set of loss levels from a plurality of loss levels to each application. Each loss level in the set of loss levels corresponds to a different type of risk associated to an application. The method define a presentation that identifies a total monetary residual risk of loss due to security risks for the plurality of applications by assigning a monetary value to the set of loss levels assigned to each application. The method receives an adjustment to a loss level for at least one application. The method defines a presentation that identifies a revised total monetary residual risk of loss based on the adjustment to said at least one loss level.

18 Claims, 33 Drawing Sheets

(56) References Cited

U.S. PATENT DOCUMENTS

| | | |
|---|---|---|
| 8,132,260 B1 | 3/2012 | Mayer et al. |
| 8,495,747 B1 | 7/2013 | Nakawatase et al. |
| 8,584,092 B2 | 11/2013 | Yawalkar et al. |
| 8,595,845 B2 | 11/2013 | Basavapatna et al. |
| 8,955,116 B2 | 2/2015 | Ikeda |
| 9,100,428 B1 | 8/2015 | Visbal |
| 9,411,965 B2 | 8/2016 | Giakouminakis et al. |
| 9,479,357 B1 | 10/2016 | Fu et al. |
| 2004/0083129 A1 | 4/2004 | Herz |
| 2005/0044451 A1 | 2/2005 | Fry et al. |
| 2006/0075503 A1 | 4/2006 | Bunker et al. |
| 2007/0100744 A1* | 5/2007 | Wu .................. G06Q 40/00 705/38 |
| 2007/0156495 A1 | 7/2007 | King |
| 2007/0157311 A1 | 7/2007 | Meier et al. |
| 2007/0233787 A1* | 10/2007 | Pagan ............... G06Q 10/107 709/206 |
| 2008/0294931 A1 | 11/2008 | Bantz et al. |
| 2009/0260086 A1 | 10/2009 | Lang et al. |
| 2011/0047114 A1 | 2/2011 | Marvell et al. |
| 2011/0126111 A1 | 5/2011 | Gill et al. |
| 2011/0178942 A1* | 7/2011 | Watters ............... G06Q 10/06 705/325 |
| 2012/0180133 A1 | 7/2012 | Al-Harbi et al. |
| 2012/0254671 A1 | 10/2012 | Francisco et al. |
| 2013/0247205 A1 | 9/2013 | Schrecker et al. |
| 2013/0340084 A1 | 12/2013 | Schrecker et al. |
| 2014/0165128 A1 | 6/2014 | Auvenshine et al. |
| 2014/0237545 A1 | 8/2014 | Mylavarapu et al. |
| 2014/0282820 A1* | 9/2014 | Walton ................ G06F 21/604 726/1 |
| 2016/0028758 A1 | 1/2016 | Ellis et al. |
| 2016/0065621 A1 | 3/2016 | Bradley et al. |
| 2016/0103992 A1 | 4/2016 | Roundy et al. |
| 2016/0197953 A1 | 7/2016 | King-Wilson |
| 2016/0294854 A1 | 10/2016 | Parthasarathi et al. |
| 2016/0306965 A1 | 10/2016 | Iyer et al. |
| 2017/0118237 A1 | 4/2017 | Reddy et al. |
| 2017/0213037 A1* | 7/2017 | Toledano ............. G06F 21/552 |
| 2017/0243009 A1 | 8/2017 | Sejpal et al. |
| 2018/0121657 A1 | 5/2018 | Hay et al. |
| 2018/0124094 A1 | 5/2018 | Hamdi |
| 2018/0239903 A1* | 8/2018 | Bodin .................. G06F 21/577 |
| 2018/0268313 A1 | 9/2018 | Baxter |
| 2018/0276377 A1 | 9/2018 | Griffin et al. |
| 2018/0324202 A1 | 11/2018 | Lim |
| 2018/0337939 A1 | 11/2018 | Agarwal |
| 2019/0052665 A1 | 2/2019 | Mahieu et al. |

OTHER PUBLICATIONS

Non-Published commonly Owned U.S. Appl. No. 15/836,785, filed Dec. 8, 2017, 58 pages, Bay Dynamics, Inc.
Non-Published commonly Owned U.S. Appl. No. 15/836,786, filed Dec. 8, 2017, 58 pages, Bay Dynamics, Inc.
Non-Published commonly Owned U.S. Appl. No. 15/836,787, filed Dec. 8, 2017, 58 pages, Bay Dynamics, Inc.
Non-Published commonly Owned U.S. Appl. No. 15/836,788, filed Dec. 8, 2017, 58 pages, Bay Dynamics, Inc.
Non-Published commonly Owned U.S. Appl. No. 15/836,789, filed Dec. 8, 2017, 58 pages, Bay Dynamics, Inc.
Non-Published commonly Owned U.S. Appl. No. 15/836,790, filed Dec. 8, 2017, 58 pages, Bay Dynamics, Inc.
Non-Published commonly Owned U.S. Appl. No. 15/836,791, filed Dec. 8, 2017, 76 pages, Bay Dynamics, Inc.
Non-Published commonly Owned U.S. Appl. No. 15/836,793, filed Dec. 8, 2017, 77 pages, Bay Dynamics, Inc.
Non-Published commonly Owned U.S. Appl. No. 15/836,795, filed Dec. 8, 2017, 47 pages, Bay Dynamics, Inc.
Non-Published commonly Owned U.S. Appl. No. 15/836,796, filed Dec. 8, 2017, 47 pages, Bay Dynamics, Inc.
Non-Published commonly Owned U.S. Appl. No. 15/836,797, filed Dec. 8, 2017, 37 pages, Bay Dynamics, Inc.

* cited by examiner

Host Vulnerabilities

| Computer | Application(s) | Residual Risk of Loss | Vulnerability | Status | Severity | Owner | Assigned to | Due Date |
|---|---|---|---|---|---|---|---|---|
| | | 20 | Firewall Removed | New | Low | Janet | | 5/11/2017 |
| | | 12 | Memory Corruption | New | Low | Fred | | 5/15/2017 |
| | | 20 | Outdated Version | New | Medium | Janet | | 5/25/2017 |
| | | 17 | Memory Corruption | New | Low | Fred | | 6/18/2017 |
| | | 45 | Remote Code Exec | New | Low | Janet | | 6/18/2017 |
| | | 25 | Memory Corruption | New | Low | Fred | | 5/15/2017 |
| | | 65 | Remote Code Exec | New | High | Mike | | 7/8/2017 |
| | | 35 | Outdated Version | New | High | Janet | | 6/18/2017 |
| | | 8 | Remote Code Exec | New | Low | Mike | | 5/27/2017 |
| | | 65 | Denial of Service | New | High | Fred | | 5/11/2017 |
| | | 70 | Information Loss | New | High | Janet | | 5/23/2017 |
| | | 54 | Denial of Service | New | High | Fred | | 5/17/2017 |

*Fig. 1*

Host Vulnerabilities

| Computer | Application(s) | Residual Risk of Loss | Vulnerability | Status | Severity | Owner | Assigned to | Due Date |
|---|---|---|---|---|---|---|---|---|
| | | 20 | Firewall Removed | New | Low | Janet | | 5/11/2017 |
| | | 12 | Memory Corruption | New | Low | Fred | | 5/15/2017 |
| | | 20 | Outdated Version | New | Medium | Janet | | 5/26/2017 |
| | | 17 | Memory Corruption | New | Low | Fred | | 6/18/2017 |
| | | 45 | Remote Code Exec | New | Low | Janet | | 6/18/2017 |
| | | 25 | Memory Corruption | New | Low | Fred | | 5/15/2017 |
| | | 65 | Remote Code Exec | New | High | Mike | | 7/9/2017 |
| | | 35 | Outdated Version | New | High | Janet | | 6/19/2017 |
| | | 8 | Remote Code Exec | New | Low | Mike | | 5/20/2017 |
| | | 65 | Denial of Service | New | High | Fred | | 5/11/2017 |
| | | 70 | Information Loss | New | High | Janet | | 5/23/2017 |
| | | 54 | Denial of Service | New | High | Fred | | 6/17/2017 |

*Fig. 2*

Host Vulnerabilities

| Computer | Application(s) | Residual Risk of Loss | Vulnerability | Status | Severity | Owner | Assigned to | Due Date |
|---|---|---|---|---|---|---|---|---|
| | | 20 | Firewall Removed | New | Low | Janet | George | 5/11/2017 |
| | | 12 | Memory Corruption | New | Low | Fred | George | 5/15/2017 |
| | | 20 | Outdated Version | New | Medium | Janet | Fred | 5/25/2017 |
| | | 17 | Memory Corruption | New | Low | Fred | Fred | 6/18/2017 |
| | | 45 | Remote Code Exec | New | Low | Janet | Maryam | 6/16/2017 |
| | | 25 | Memory Corruption | New | Low | Fred | Fred | 5/15/2017 |
| | | 65 | Remote Code Exec | New | High | Mike | Janet | 7/6/2017 |
| | | 35 | Outdated Version | New | High | Janet | Janet | 6/18/2017 |
| | | 8 | Remote Code Exec | New | Low | Mike | Sue | 5/27/2017 |
| | | 65 | Denial of Service | New | High | Fred | Maryam | 5/11/2017 |
| | | 70 | Information Loss | New | High | Janet | Cyrus | 5/23/2017 |
| | | 54 | Denial of Service | New | High | Fred | Maryam | 5/17/2017 |

*Fig. 3*

Host Vulnerabilities

| Computer | Application(s) | Residual Risk of Loss | Vulnerability | Status | Sever... | Owner | Assigned to | Due Date |
|---|---|---|---|---|---|---|---|---|
| | | | | | Severity 150 | | 155 | |
| ☐ | Enterprise Plan... | 12 | Memory Corruption | New | Low | Fred | George | 5/15/2017 |
| ☐ | Enterprise Ban... | 20 | Outdated Version | New | Medium | Janet | Fred | 5/25/2017 |
| ☐ | Endpoint Bank... | 17 | Memory Corruption | New | Low | Fred | Fred | 6/18/2017 |
| ☐ | Endpoint Bank... | 25 | Memory Corruption | New | Low | Fred | Fred | 5/15/2017 |
| ☐ | Endpoint Bank... | 8 | Remote Code Exec | New | Low | Mike | Sue | 5/27/2017 |
| ☐ | Identity Manag... | 65 | Denial of Service | New | High | Fred | Maryam | 5/11/2017 |
| ☐ | Identity Mana... | 54 | Denial of Service | New | High | Fred | Maryam | 5/17/2017 |

Web Vulnerabilities

| Domain | Application | Residual Risk of Loss ($1K) | Vulnerability | Owner | Assignee | Status | First Found | Last Found | Last Scan |
|---|---|---|---|---|---|---|---|---|---|
| applicationdevelopment.com | Application Development | $32 | Remote Code Exec | Demo User | | New | 4/12/17 | 4/26/17 | 4/26/17 |
| applicationdevelopment.com | Application Development | $1,200 | Memory Corruption | Demo User | | New | 4/12/17 | 4/26/17 | 4/26/17 |
| applicationdevelopment.com | Application Development | $5 | Security Bypass | Demo User | | New | 3/05/17 | 4/26/17 | 4/26/17 |
| applicationdevelopment.com | Application Development | $371 | Denial of Service | Demo User | | New | 2/16/17 | 4/11/17 | 4/26/17 |
| applicationdevelopment.com | Application Development | $23,000 | Security Bypass | Demo User | | New | 4/12/17 | 4/26/17 | 4/26/17 |
| businessintelligence.com | Business Intelligence | $150 | Denial of Service | Demo User | | New | 3/18/17 | 3/19/17 | 4/26/17 |
| businessintelligence.com | Business Intelligence | $18 | Privilege Escalation | Demo User | | New | 4/12/17 | 4/26/17 | 4/26/17 |
| businessintelligence.com | Business Intelligence | $94 | Denial of Service | Demo User | | New | 4/05/17 | 4/13/17 | 4/26/17 |
| cnn.com | | $1,300 | Remote Code Exec | Demo User | | New | 4/19/17 | 4/13/17 | 4/26/17 |
| cnn.com | | $450 | Privilege Escalation | Demo User | | New | 4/12/17 | 4/26/17 | 4/26/17 |
| cnn.com | | $11 | | Demo User | | New | 2/5/17 | 3/23/17 | 4/26/17 |

Watch list with event counts from 03/27/2017

| Name | Type | Owner | Entities | DIM Events | EP Events | Authentication Events | Web Activity |
|---|---|---|---|---|---|---|---|
| PCI Watchlist | Public | NT AUTHORITY\SYSTEM | 11 | 302 | 283 | 6,633 | 149,493 |
| Authentication to PCI Servers Watchlist | Public | NT AUTHORITY\SYSTEM | 70 | 22,367 | 106,829 | 2,389,245 | 2,915,328 |
| SOX Watchlist | Public | NT AUTHORITY\SYSTEM | 71 | 27,571 | 133,580 | 2,978,343 | 3,547,487 |

*Fig. 15*

Applications Overview / Enterprise Backup

Endpoint Backup — 2010

Risk Rating:

Risk Level | Risk Assessment | Timeline | Details

Select the application Inherent Risk

○ Very Low  ● Low  ○ Medium  ○ High  ○ Very High  ○ Not Defined

Select the potential effect of the application loss of confidentiality on the organization ● Low  ○ Medium  ○ High  ○ Not Defined Select the potential effect of the application loss of integrity on the organization ● Low  ○ Medium  ○ High  ○ Not Defined Select the potential effect of the application loss of availability on the organization ○ Low  ● Medium  ○ High  ○ Not Defined
        / 2120

CANCEL  SAVE

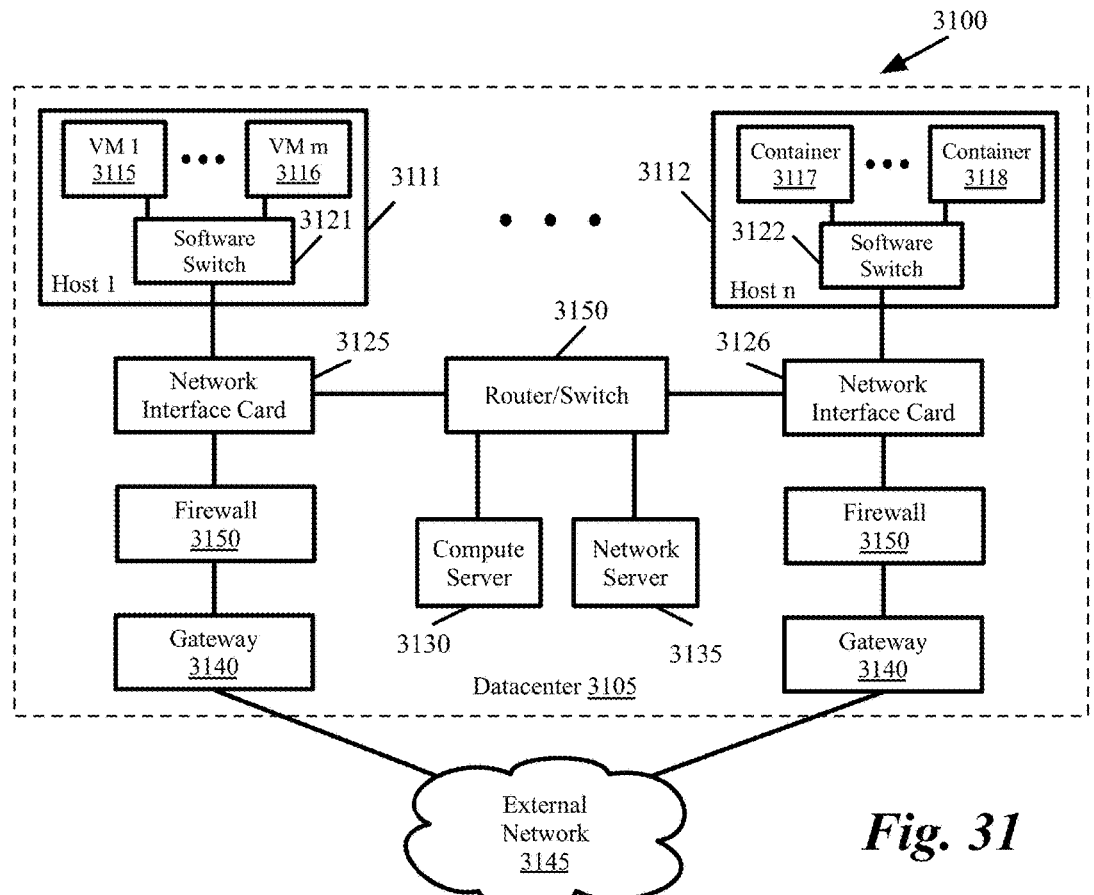
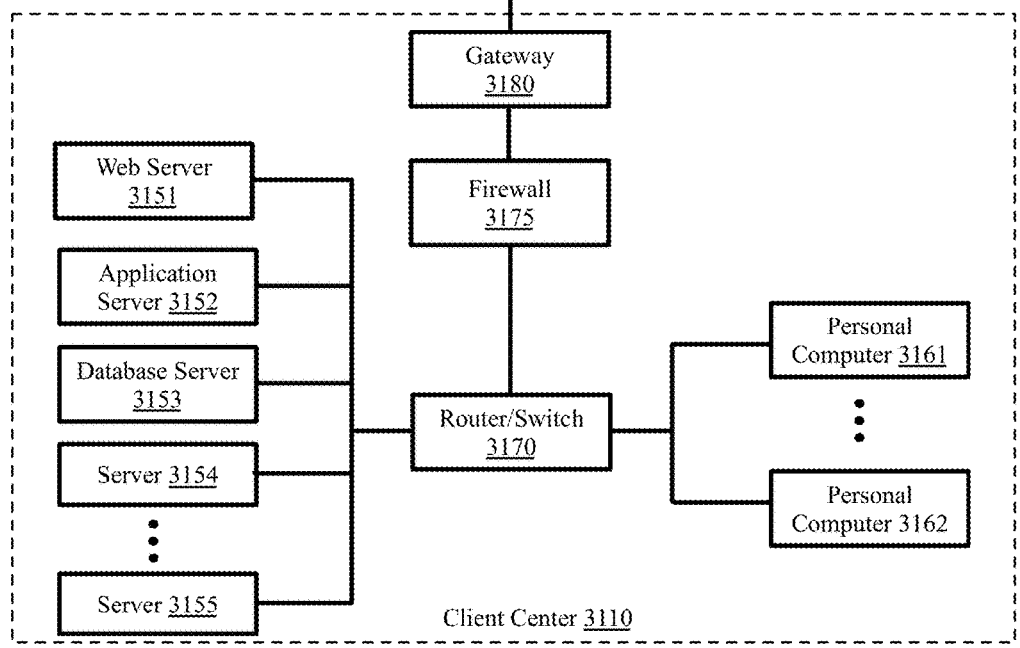
Fig. 31

DETERMINING MONETARY LOSS DUE TO SECURITY RISKS IN A COMPUTER SYSTEM

CLAIM OF BENEFIT TO PRIOR APPLICATIONS

This Application claims the benefit of U.S. Provisional Patent Application 62/505,087, filed May 11, 2017; U.S. Provisional Patent Application 62/505,091, filed May 11, 2017; U.S. Provisional Patent Application 62/505,096, filed May 11, 2017; and U.S. Provisional Patent Application 62/505,099, filed May 11, 2017. The contents of U.S. Provisional Patent Applications 62/505,087, 62/505,091, 62/505,096, and 62/505,099 are hereby incorporated by reference.

BACKGROUND

Individuals working in an organization with a large number of computers and applications face an overwhelming amount of data that is needed to identify threats and vulnerabilities, which when combined with the value of the assets that those threats and vulnerabilities are attached to, represent a security risk. In a large organization, different persons manage different computers and applications. Each of these applications usually runs with numerous open risks that have to be identified and fixed.

There is currently no platform for providing mitigation activates and tracking those activates. Individual risk management applications identify the security threats for different application or systems and do not personalize the presentation, management, and monitoring of mitigation activities based on different individuals' responsibilities.

BRIEF SUMMARY

Some embodiments provide a method of allocating tasks for reducing security risks in a computer system used by an organization. The computer system includes several applications that execute on different computers. The method provides a personalized dashboard based on the login information of each user. The dashboard allows the logged in user to view the risks that the user is responsible. The user can be a manager or a head of an organizational unit and assign the mitigation of these risks to persons under the user's supervision. The user can also be a person who receives assignments from a manager to mitigate different risks.

The method uses the login information to identify the user and display a set of risks for a set of applications for which the logged-in person is responsible to mitigate. The responsibility to mitigate includes the responsibility by the logged-in person to personally apply a mitigation or by other persons in the organizational hierarchy that directly or indirectly report to the logged-in person. The method also indicates the status of each mitigation task. Examples of a mitigation task status include one or more of the followings: assigned, not assigned, started, in progress, not stated, completed, etc. When a mitigation task is assigned to a person or a group of persons, the method also displays the name of the person or persons that are assigned to apply the mitigation.

When the logged-in person supervises other persons, the method displays the list of persons in the hierarchy that are supervised by the logged-in person. The method receives assignments from different persons in the hierarchy to mitigate one or more of the displayed risks. When the method receives an update to the hierarchy that indicates a first person assigned to mitigate a particular risk is no longer in the hierarchy supervised by the logged-in person, the method changes the status of the particular risk to not assigned. The method updates the name of the responsible person when the method receives an assignment to a second person in the updated hierarchy to mitigate the particular risk.

The method in some embodiments receives an update to the hierarchy that indicates a new person is added to the hierarchy supervised by the logged-in person. The method adds the name of the new person to the list of persons supervised by the logged-in person and receives a reassignment for the mitigation of at least one risk from another person in the hierarchy to the new person.

The method displays the list of persons in the hierarchy as follows. The method identifies the logged-in person based on the login information. The method then retrieves a hierarchical list of persons in the organization and displays the list of persons as persons in a group that is directly or indirectly supervised by the logged-in person. The method also displays the list of mitigations performed by each person in the hierarchy in a selected period of time.

Some embodiments provide a method of monitoring tasks for reducing security risks in a computer system. The computer system includes several applications that execute on different computers. The method provides a personalized dashboard based on the login information of each user. The dashboard allows the logged-in user to monitor the mitigation of different risks identified for the applications that the logged in person is responsible to mitigate. The responsibility to mitigate includes the responsibility by either the logged-in person or by other persons in the organizational hierarchy that directly or indirectly report to the logged-in person.

The method, based on a set of login information, displays risks for a set of applications. The method also displays the identification of the person or persons supervised by the logged-in person that are assigned to mitigate each risk. The method also displays the current status of each mitigation. Examples of a mitigation task status include one or more of the followings: assigned, not assigned, started, in progress, not stated, completed, etc. When a mitigation task is assigned to a person or a group of persons, the method also displays the name of the person or persons that are assigned to apply the mitigation.

The method further receives reassignment of a mitigation to a different person in the hierarchy based on the current status of the mitigation. The method also receives reassignment of a mitigation to a different person in the hierarchy based on the current status of one or more other mitigations. The method in some embodiments displays a set of risks that the logged-in person is assigned to personally mitigate and the current status of each risks that the logged-in person is personally assigned to mitigate.

The method in some embodiments displays additional information related to each risk. The additional information includes the first detection and the last detection of each risk. The additional information also includes the location where an application associated with each risk is executed. The additional information further includes the identification of one or more organizational units that use each application associated with a risk.

The set of risks for each application includes risks for credential-threat of the application. The mitigation of credential-threat risks of an application includes revising the credentials of one or more users for accessing the application.

The set of risks for each application includes risks for an application-threat. The application-threats are identified in some embodiments by the lack of one or more security measures to prevent an unauthorized exploit of the application. The application-threats are further identified based on the current configuration of the application or the current configuration of a computer executing the application.

Some embodiments provide a method of determining the monetary loss due to security risks associated with applications that execute in a computer system. The method uses a set of discrete loss levels and assigns a loss level to each application. The discrete loss levels are used for determining the total loss associated with each application. Examples of the discrete loss levels include very low, low, medium, high, very high, and not defined.

The method then assigns a monetary value to each loss level and presents the total monetary residual risk of loss for the set of applications. The method then receives adjustments to the loss level associated with at least one application. The method revises the total monetary residual risk of loss based on the adjustment to the loss level and presents the revised residual risk of loss.

The method in some embodiments also receives an adjustment to the monetary residual risk of loss associated with at least one loss level and presents a revised total monetary residual risk of loss based on the adjustment. The method in some embodiments determines the potential effects of an application loss of confidentiality of data, loss of integrity, and loss of availability. The loss of integrity of an application includes the lack of one or more security measures to prevent the unauthorized exploit of the application whereas the loss of confidentiality of customer data includes the compromise of personal identifications of one or more customers. Each of these potential effects is assigned one of a set of discrete effects and the discrete loss levels are used for determining the loss associated with each type of loss. Examples of discrete effects assigned to the potential effects include low, medium, high, and not defined.

The method in some embodiments provides a user interface that displays the loss levels for each application and provides a tool for changing the loss level associated with different applications. The user interface also allows a user to enter a revised monetary residual risk of loss associated with each loss level and/or associated with each application. The residual risk of loss associated with each application and the total residual risk of loss are modified based on the received changes.

The method in some embodiments directs a set of machine-executable processes to examine the operating environment of the applications that execute in the computer system to identify security risks in the computer system. The method presents a revised total monetary residual risk of loss based on the examining of the operating environment. The method in some embodiments also receives an adjustment to the monetary value for at least one loss level based on the security risks identified in the examination of the operating environment and defines a presentation that identifies a revised total monetary residual risk of loss based on the adjustment to said at least one loss level.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 1 conceptually illustrates a graphical user interface (GUI) for providing personalized dashboards for allocating and monitoring tasks for reducing security risks in an organization's computer system in some embodiments.

FIG. 2 illustrates the GUI of FIG. 1 used for assigning mitigation of security risks to different persons.

FIG. 3 illustrates the GUI of FIG. 2 after the user has assigned the mitigation tasks of new risks to herself or to persons reporting to her.

FIG. 4 conceptually illustrates a graphical user interface (GUI) for providing a personalized dashboard in some embodiments.

FIG. 5 conceptually illustrates a graphical user interface (GUI) for providing a personalized dashboard in some embodiments.

FIG. 7 conceptually illustrates a graphical user interface (GUI) for providing personalized dashboards for allocating and monitoring tasks for reducing security risks in an organization's computer system in some embodiments.

FIG. 8 conceptually illustrates the GUI of FIG. 3 that is automatically updated after a change in the management hierarchy.

FIG. 11 conceptually illustrates a GUI for displaying data in motion events in some embodiments.

FIG. 15 illustrates a GUI for adding users and risks to watch lists and monitoring statistics regarding the items in the watch list in some embodiments.

FIG. 21 illustrates the GUI of FIG. 18 for assigning risk levels to applications in some embodiments.

FIG. 23 illustrates the GUI of FIG. 20 after the discrete level assigned to the application loss of availability on the organization for the endpoint backup application is changed from medium to low.

FIG. 31 conceptually illustrates an example of a computer system for which the security risks are identified and mitigated in some embodiments of the invention FIG. 32 conceptually illustrates an electronic system with which some embodiments of the invention are implemented.

DETAILED DESCRIPTION

Figure 6:
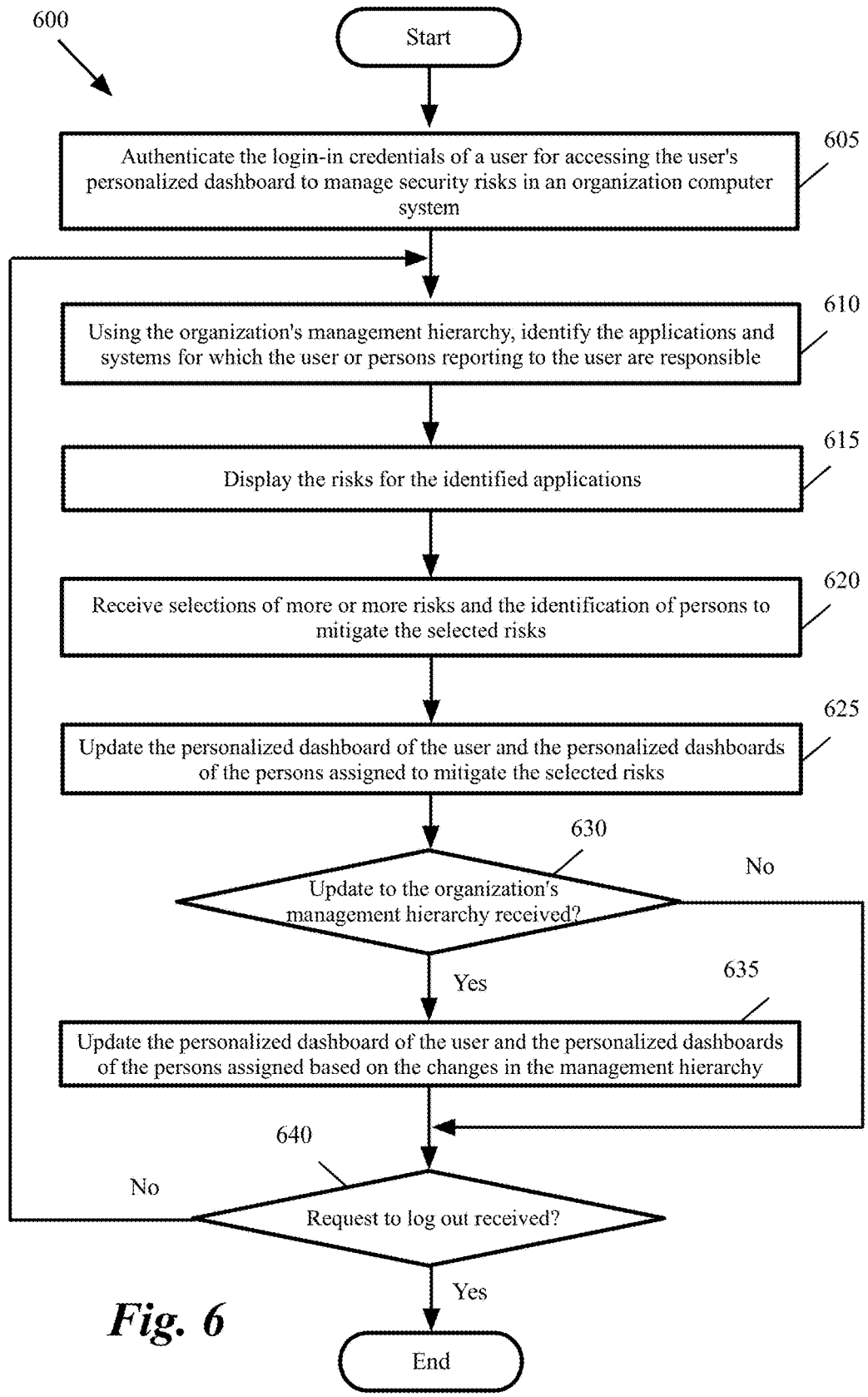
FIG. 6 conceptually illustrates a process for providing a personalized dashboard for managing cyber security risks in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a personalized dashboard for allocating and monitoring tasks for reducing security risks (or vulnerabilities) in an organization's computer system. The personalized dashboard in some embodiments is provided based on login information of each user. The dashboard allows the logged-in user to view the risks for which the user is responsible. The logged-in user can be a person who is personally responsible for mitigating different risks. The logged-in user can also be in a supervisory position such as a group supervisor, a department manager, or a head of any organizational unit.

The person in a supervisory position is able to see the risks that the group, department, or organizational unit supervised by the person is responsible to mitigate. The person in a supervisory position is able to assign the mitigation task to himself/herself or to persons under his/her supervision. The dashboard also allows the logged-in user to monitor the mitigation of different risks that the group, department, or organizational unit supervised by the person is responsible to mitigate.

I. Personalized Dashboards to Assign and Monitor Mitigation of Security Risks

Some embodiments provide a personalized dashboard for allocating and monitoring tasks for reducing security risks in an organization's computer system. FIG. 1 conceptually illustrates a graphical user interface (GUI) 100 for providing personalized dashboards for allocating and monitoring tasks for reducing security risks in an organization's computer system in some embodiments. An example of a computer system is described below by reference to FIG. 31.

Further aspects of identifying and mitigating security risks in a computer system are described in U.S. patent application Ser. No. 15/836,785, entitled "Identifying Security Risks Mitigations with the Largest Financial Impact for an Organization," concurrently filed with this application; U.S. patent application Ser. No. 15/836,795, entitled "Determining Credential and Application Cyber Security Threat Potentials by Monitoring a Computer System Environment," concurrently filed with this application; and U.S. patent application Ser. No. 15/836,797, entitled "Quantifying the Financial Impact of Cyber Security Risks," concurrently filed with this application. U.S. patent application Ser. Nos. 15/836,785; 15/836,795; and 15/836,797 are incorporated herein by reference.

The personalized dashboard in this example shows the risks 105 that are detected in the host machines in the organization's computer system. The personalized dashboard uses the login information of the user to only show the risks for which the user or persons managed by the user are responsible. The GUI shows different information such as the host computer identification 115, name 120 of the application or applications running on each host, the residual risk of loss 125 associated with each risk, the type 135 of risks, the mitigation status 140, severity 145 of the risk, the person in charge of the host computer (shown as owner 150), the person 155 assigned to mitigate the risk, and the due date 160 to mitigate.

Each application in some embodiments is associated with a total inherent risk of loss and a residual risk of loss. The loss associated with the total inherent risk of an application is the estimated loss incurred by the organization if the application were compromised. The inherent risk of loss is, therefore, the overall risk for the total exposure of an application.

The residual risk of loss is the non mitigated (or mitigable) portion of the inherent risk of loss. The residual risk of loss of an application is the risk of loss of the application that can be eliminated by mitigating the risks that are identified for the application. The non mitigated residual risk of loss for each application in some embodiments is determined as a function of the loss due to the exploit of the application and the probability of occurrence of the exploit (or the threat potential) determined by monitoring the application executing on the computers in the computer system.

In the example of FIG. 1, user Janet has logged in to her customized dashboard. The user only can see the risks for which she or persons reporting to her are responsible. For instance, Fred and Mike are group managers and work in the same department and report to Janet. Janet, therefore, can see the risks for the applications that she is responsible to oversee as well as the risks for the applications that Fred and Mike are responsible to oversee.

The status 140 shows that several new risks have been detected in the system for which the group managed by Janet or a person reporting to her is responsible. FIG. 2 illustrates the GUI 100 of FIG. 1 used for assigning mitigation of security risks to different persons. As shown, the user has selected (as shown by 230 and 235) two of the risks 220 and 225. The user has also selected the "assign user" icon 205 to show a popup 250. The popup provides the option 210 for the user to assign the mitigation task to herself or to others 215. In this example, user Janet assigns both tasks to herself (e.g., because the tasks are high severity as shown by 255).

The user repeats selection and assignment of different mitigations. FIG. 3 illustrates the GUI 100 of FIG. 2 after the user has assigned the mitigation tasks of new risks to herself or to persons reporting to her. As shown, some mitigation tasks 305 are assigned to the same person who is also identified in the organization as the person responsible for an application (the "owner" of the application). Some of the mitigation tasks 310 are assigned to persons other than owners.

FIG. 4 conceptually illustrates a graphical user interface (GUI) 400 for providing a personalized dashboard in some embodiments. The figure shows the personalized dashboard of user Fred in the example of FIG. 3. In this example, Fred is one of the persons managed by Janet. Fred's dashboard, therefore, does not show everything that Janet's dashboard shows. Fred's dashboard only shows (i) the tasks that are owned by Fred or one of his subordinates (as shown by the owner column 150), (ii) the tasks that Fred is assigned to mitigate (as shown by the assigned to column), (iii) the tasks that are assigned to a person managed by Fed (in this example Sue 410 is managed by Fred).

Figure 5:
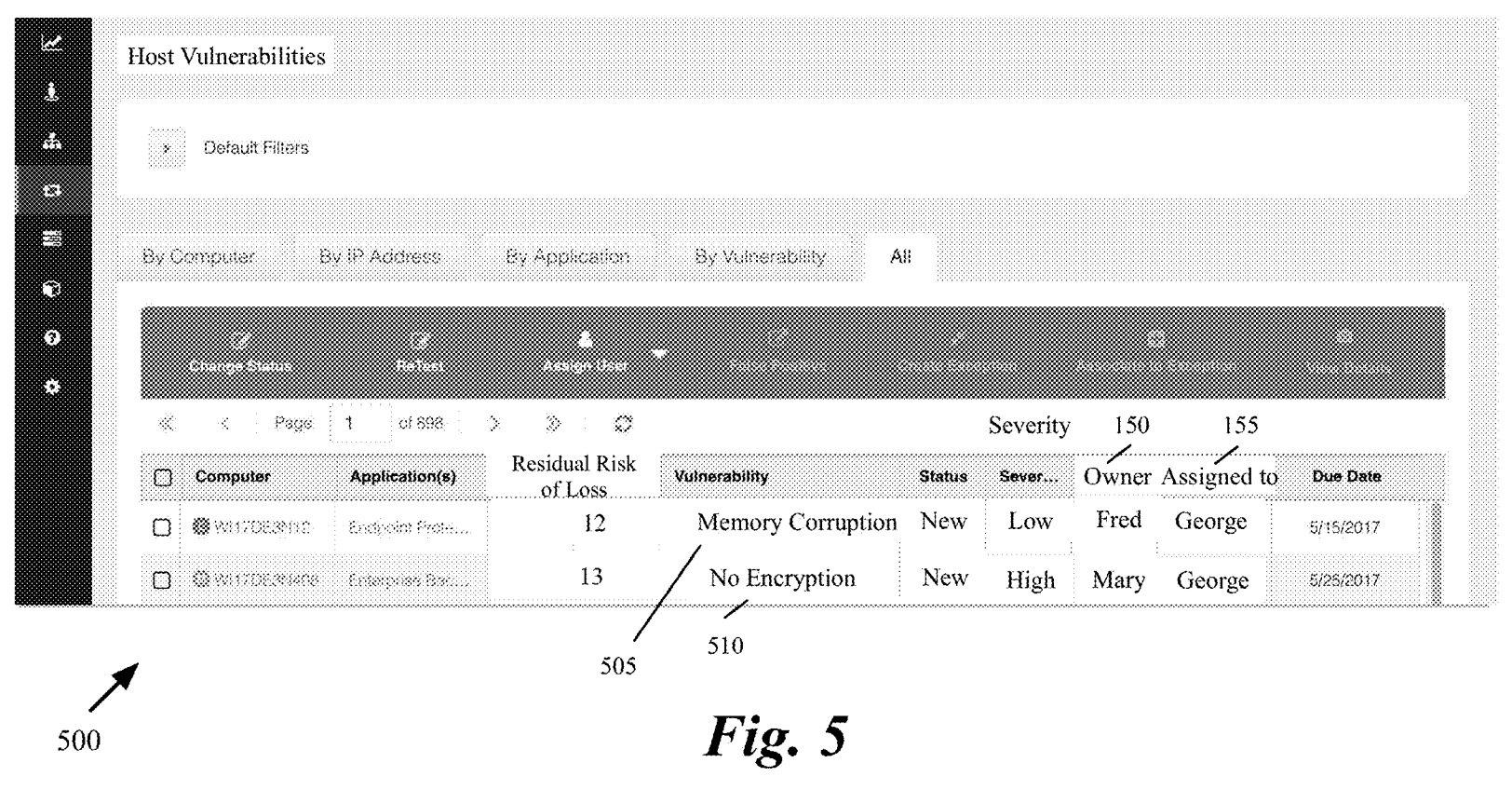

FIG. 5 conceptually illustrates a graphical user interface (GUI) 500 for providing a personalized dashboard in some embodiments. The figure shows the personalized dashboard of user George in the examples of FIGS. 3 and 4. In this example, George is one of the persons managed by Fred who is in turn managed by Janet.

George does not oversee (or own) any applications. George can only see mitigation tasks that are assigned to him. The two tasks include mitigation of memory corruption risk 505, which was also shown the Fred and Janet's dashboard.

George can also see a task to mitigation a lack of encryption risk 510. This is a task that George's manager Mary has assigned to him. As can be seen in the above examples, each particular person in an organizational hierarchy can see the risks detected for the applications that the particular person oversees (or owns), the risks that the particular person is assigned to mitigate, and the risks that a person managed by particular person owns or is assigned to mitigate.

FIG. 6 conceptually illustrates a process 600 for providing a personalized dashboard for managing cyber security risks in some embodiments. The process in some embodiments provides the GUIs shown in FIGS. 1-5. As shown, the process authenticates (at 605) the login-in credentials of a user for accessing the user's personalized dashboard to manage security risks in an organization's computer system. For instance, the process receives user name and password from a user to access GUIs 100 in FIGS. 1-3, GUI 400 in FIG. 4, or GUI 500 in FIG. 5.

The process then uses the organization's management hierarchy to identify (at 610) the applications and systems for which the user or persons reporting to the user are responsible to mitigate security risks. A directory service (such as active Directory® (AD) is a directory-based identity related service that is used to authenticate and authorize the users in a network domain.

The process identifies the applications and systems for which the logged-in person is responsible to mitigate security risks. The process also uses a directory service or a hierarchical list of persons working for the organization to identify persons that are managed by the logged-in person.

Persons that are managed by the logged-in person can be persons directly managed by the logged-in person or persons that are reporting to managers that in turn report (directly or indirectly) to the logged-in person. In this manner, a vice president in the organization can see the applications and systems that are to be mitigated by persons managed by directors, managers, supervisors, team leaders, etc., that report to the vice president. In the Example of FIG. 3, the logged-in user Janet is able to see the applications and tasks for which Fred (a direct report) is responsible as well as applications and tasks for which Sue (an indirect report who is managed by Fred) is responsible.

The process then displays (at 615) the risks for the identified applications. For instance, the process display the applications and host shown in FIG. 1. In some embodiments, a user can determine which screen is displayed upon log in. In addition, the user can determine what information is displayed on the screen.

FIG. 7 conceptually illustrates a graphical user interface (GUI) 700 for providing personalized dashboards for allocating and monitoring tasks for reducing security risks in an organization's computer system in some embodiments. As shown, the dashboard for this user defaults to showing web risks 705 as opposed to host risks for the user in FIG. 1. Although both users can navigate the GUI to show either display pages.

The user in the example of FIG. 7 has selected different information than the user in FIG. 1 to show as default for the risks (such as first found 710, last found 715, and last scan date 720). In addition, in the embodiments of FIG. 7, the residual risk of loss 725 is shown as a monetary value (in multiple of $1,000 dollars) instead of a relative number shown in FIG. 1.

Referring back to FIG. 6, the process receives (at 620) selections of one or more risks and the identification of persons to mitigate the selected risks. For instance, the process receives the selection of the risks displayed in FIG. 3 and the identification of the users that are assigned to mitigate the risks.

Next, the process updates (at 625) the personalized dashboard of the user and the personalized dashboards of the persons assigned to mitigate the selected risks. For instance, the process updates the dashboards of Janet, Fred, and George as described above by reference to FIGS. 3-5.

The process then determines (at 630) whether an update to the organization's management hierarchy is received. If not, the process proceeds to 640, which is described below. Otherwise, the process updates (at 635) the personalized dashboard of the user and the personalized dashboards of the persons assigned based on the changes in the management hierarchy.

Figure 8:
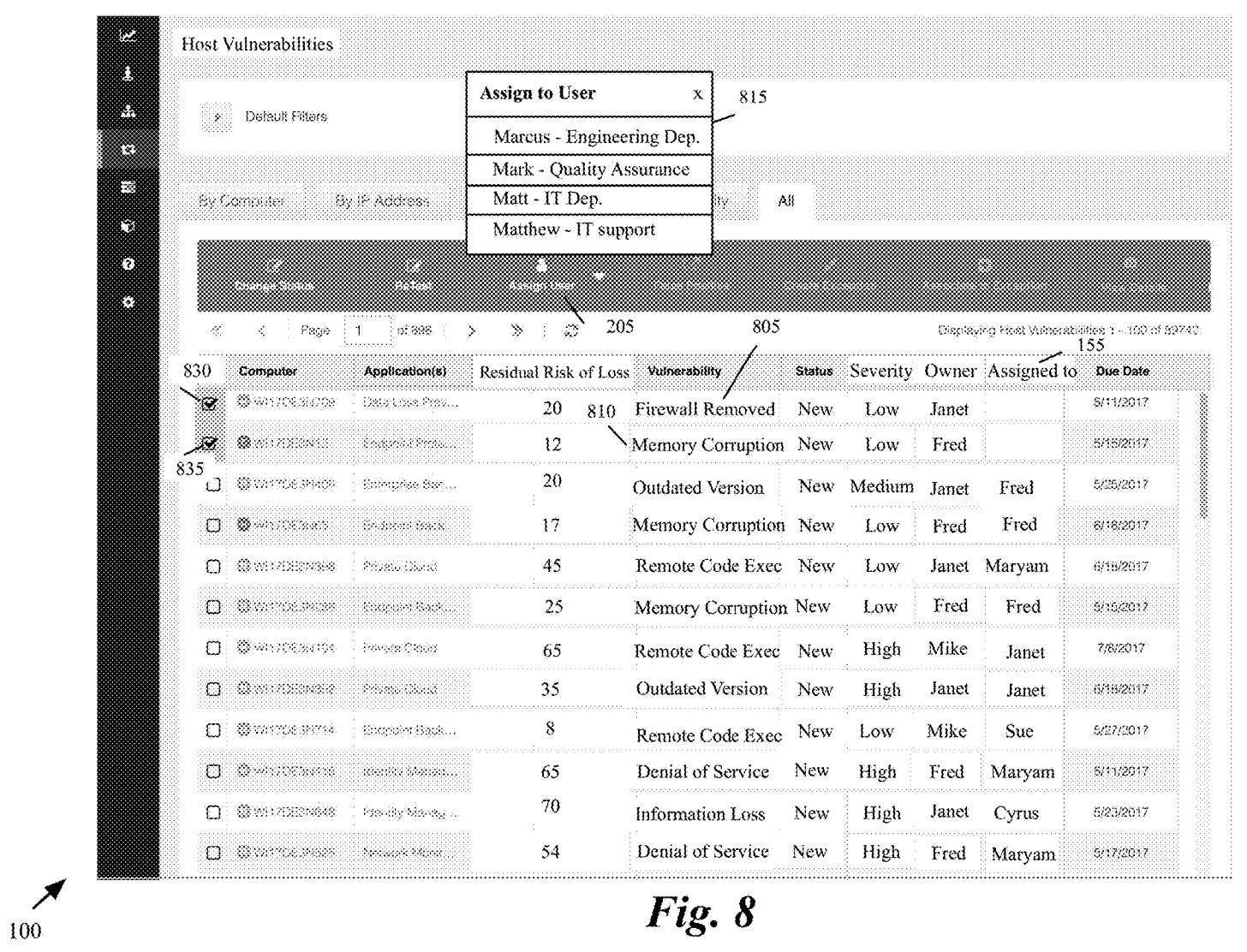

FIG. 8 conceptually illustrates the GUI of FIG. 3 that is automatically updated after a change in the management hierarchy. In this example, George is no longer working for the organization. Process 600 receives updates to the organization's management hierarchy through the directory service. As shown, the process has removed George's name from the "assigned to" column 155 and mitigation of risks 805 and 810 are no longer assigned to anyone.

As shown, user Janet has selected risks 805 and 810 (as shown by 830 and 835). Janet then selects the "assign user" icon 205 to show pop-up 250 (shown in FIG. 2). Janet selects option "other user" 215 (shown in FIG. 2) to show popup menu 815. As Janet types the first few letters of a name, the name of any person in the organization's directory service with a matching name that is managed by Janet is displayed. In this example, Janet has typed letters "ma", which results in four names to be displayed.

The names include Matt, which is recently hired and is managed by a person that is in turn managed by Janet. The list of persons reporting to Janet is updated by process 600 based on the information in the organization's directory service. Janet selects Matt's name as a person to mitigate risks 805 and 810.

Referring back to FIG. 6, the process determines (at 640) whether a request to log out is received from the user. If yes, the process ends. Otherwise, the process proceeds to 605 to update the dashboard of the user in real-time.

II. Personalized Dashboards to Assign and Monitor Mitigation of Security Risks

Some embodiments provide a method of monitoring tasks for reducing security risks in a computer system. The method provides a personalized dashboard based on the login information of each user. The dashboard allows the logged-in user to monitor the status of different risks of the applications for which the user or other persons that are managed by the user are responsible.

Figure 9A:
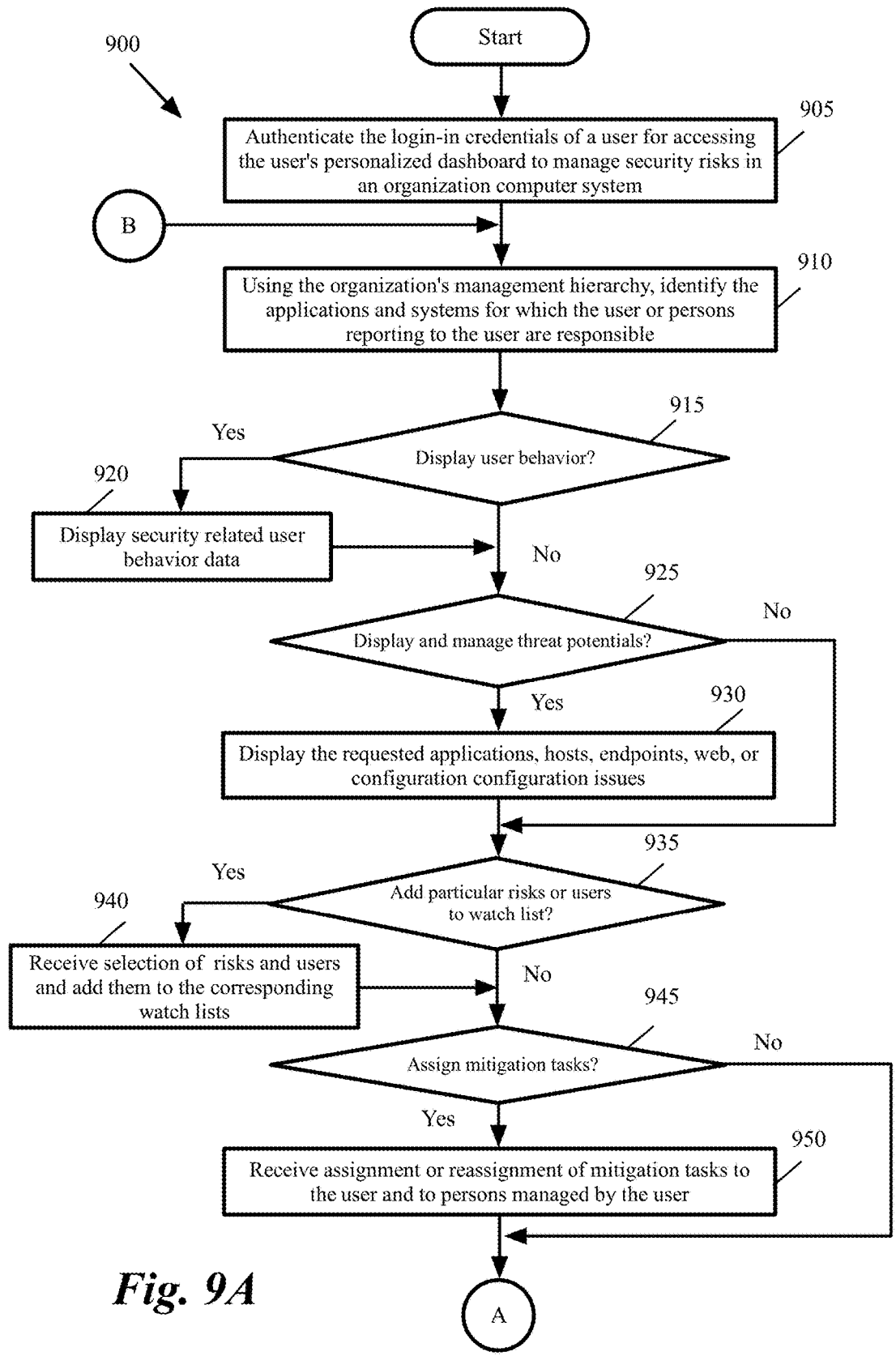
FIGS. 9A-9B conceptually illustrate a process for monitoring tasks for reducing security risks in a computer system in some embodiments.
Figure 9B:
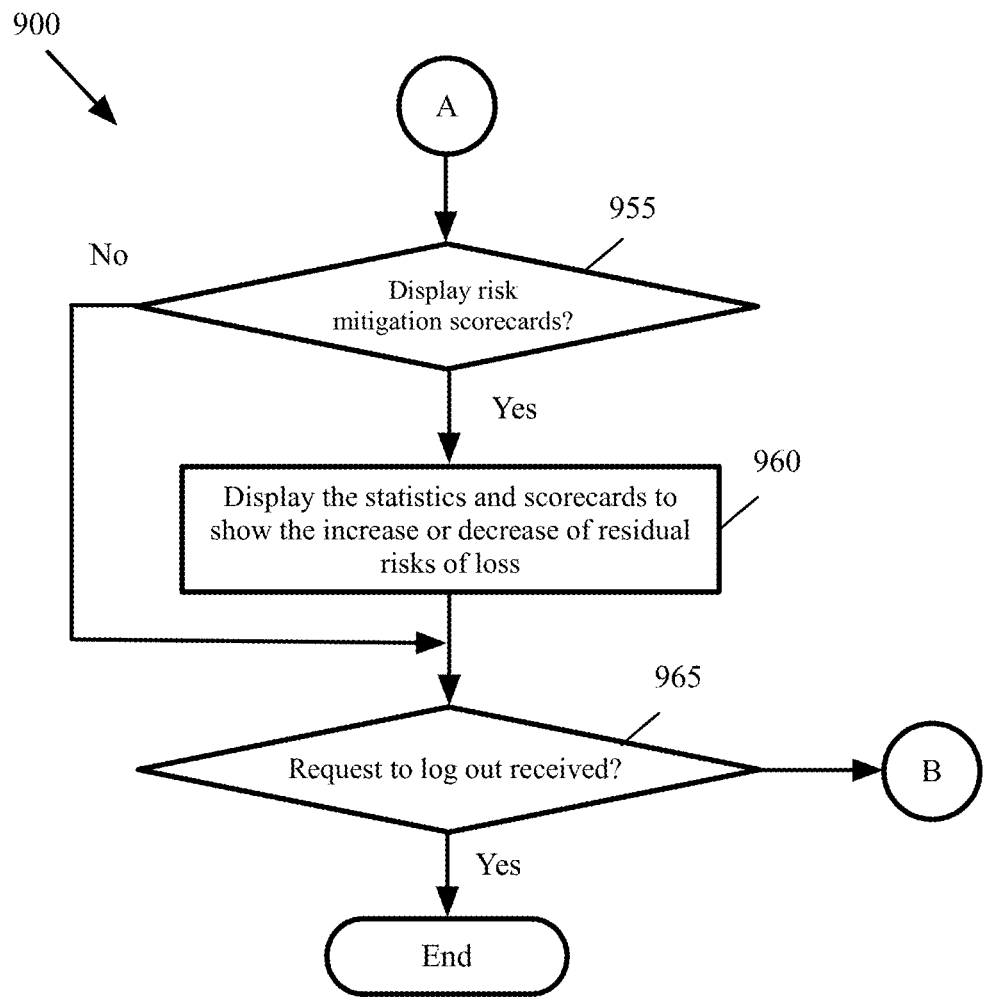

FIGS. 9A-9B conceptually illustrate a process 900 for monitoring tasks for reducing security risks in a computer system in some embodiments. As shown, the process authenticates (at 905) the login-in credentials of a user for accessing the user's personalized dashboard to manage security risks in an organization's computer system.

The process uses the organization's management hierarchy to identify (at 910) the applications and systems for which the user or persons reporting to the user are responsible. The process then determines (at 915) whether a request to display user behavior is received. If not, the process proceeds to 925, which is described below.

Figure 10:
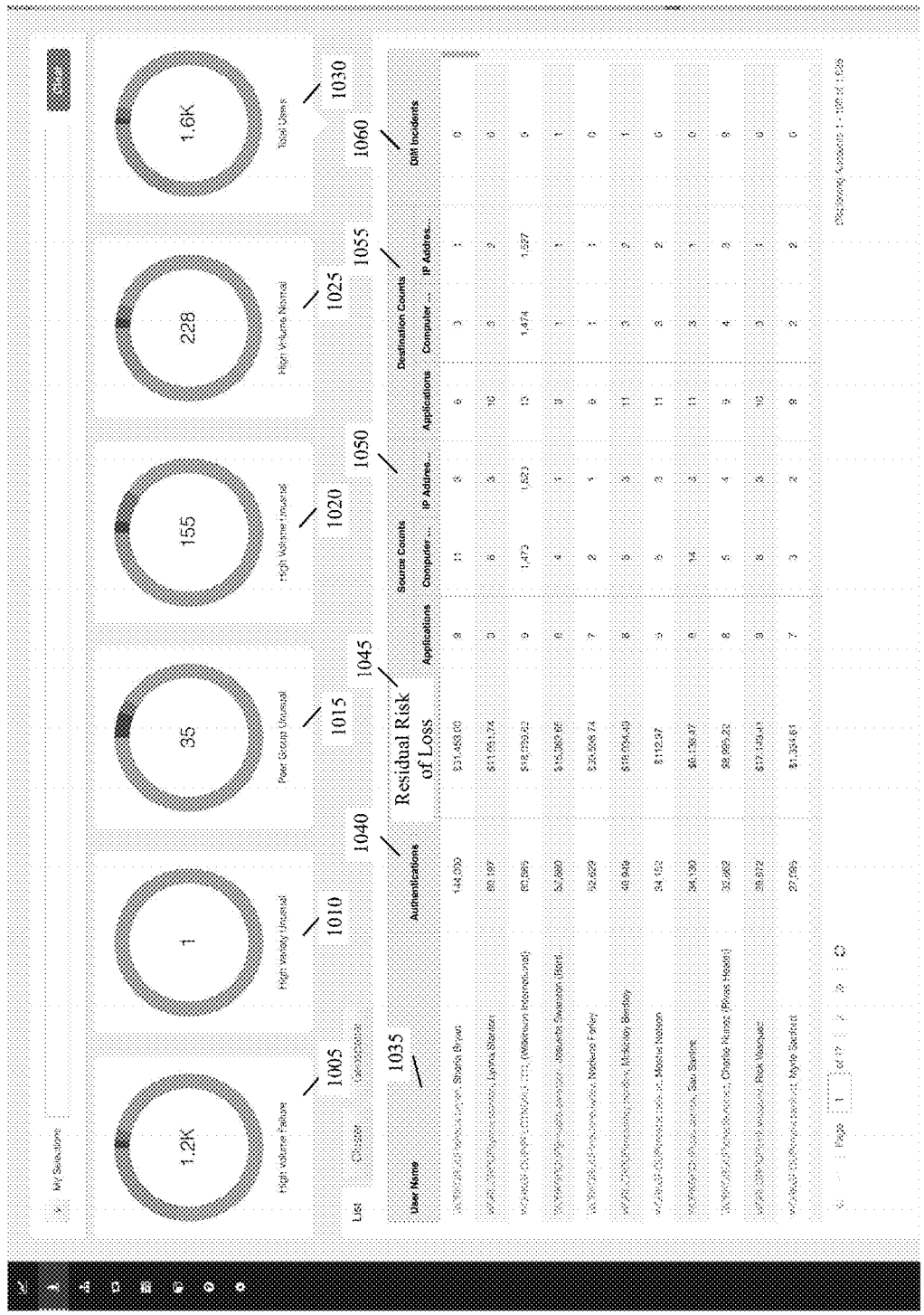
FIG. 10 conceptually illustrates a GUI for displaying security related user behavior data in some embodiments.

Otherwise, the process displays (at 920) user behavior data with threat potential such as summary of authentication events, summary of data in motion (DIM), as well as activities of individual users. Each user is able to only see the user behavior data for himself/herself as well as persons reporting to the user through the organization's management hierarchy. FIG. 10 conceptually illustrates a GUI 1000 for displaying security related user behavior data in some embodiments. As shown, the logged-in user is able to see the user behavior data for himself/herself as well as persons reporting to the user through the organization's management hierarchy.

The user behavior data in this example includes user name 1035, authentication requests 1040, residual risk of loss 1045, statistics for the authentication source 1050 (e.g., source applications, source computers, source IP addresses from which an authentication request is initiated), statistics for the authentication destination 1055 (e.g., destination applications, destination computers, destination IP addresses for which an authentication request is initiated), and data in DIM events 1060.

The GUI also displays statistics for authentication events. In this example, the authentication events are classified (in the order of severity) as high volume authentication failures 1005, high variety unusual 1010, peer group unusual 1015, high volume unusual 1020, high volume normal 1025, and total users 1030.

Figure 11:
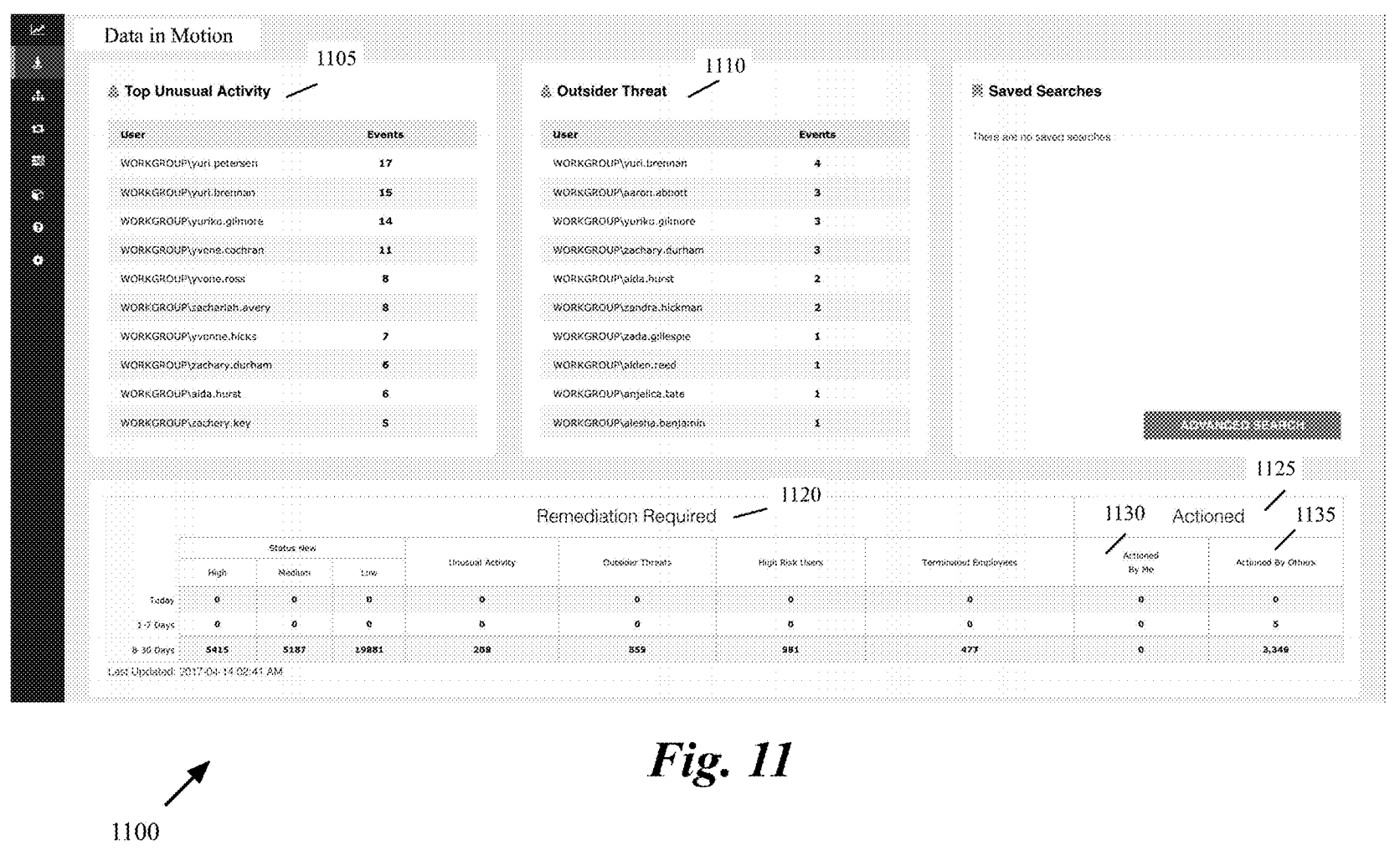

FIG. 11 conceptually illustrates a GUI 1100 for displaying data in motion events in some embodiments. Each user is able to only see the user behavior DIM for himself/herself as well as persons reporting to the user through the organization's management hierarchy.

In this example, the GUI displays top unusual activities 1105 and outside threats 1110. The GUI also shows statistics for the required remediations 1120 and statistics for the actions taken 1125. The actions taken include actions 1130 taken by the logged-in user and actions 1135 taken by persons managed by the user through the organizational hierarchy.

Figure 12:
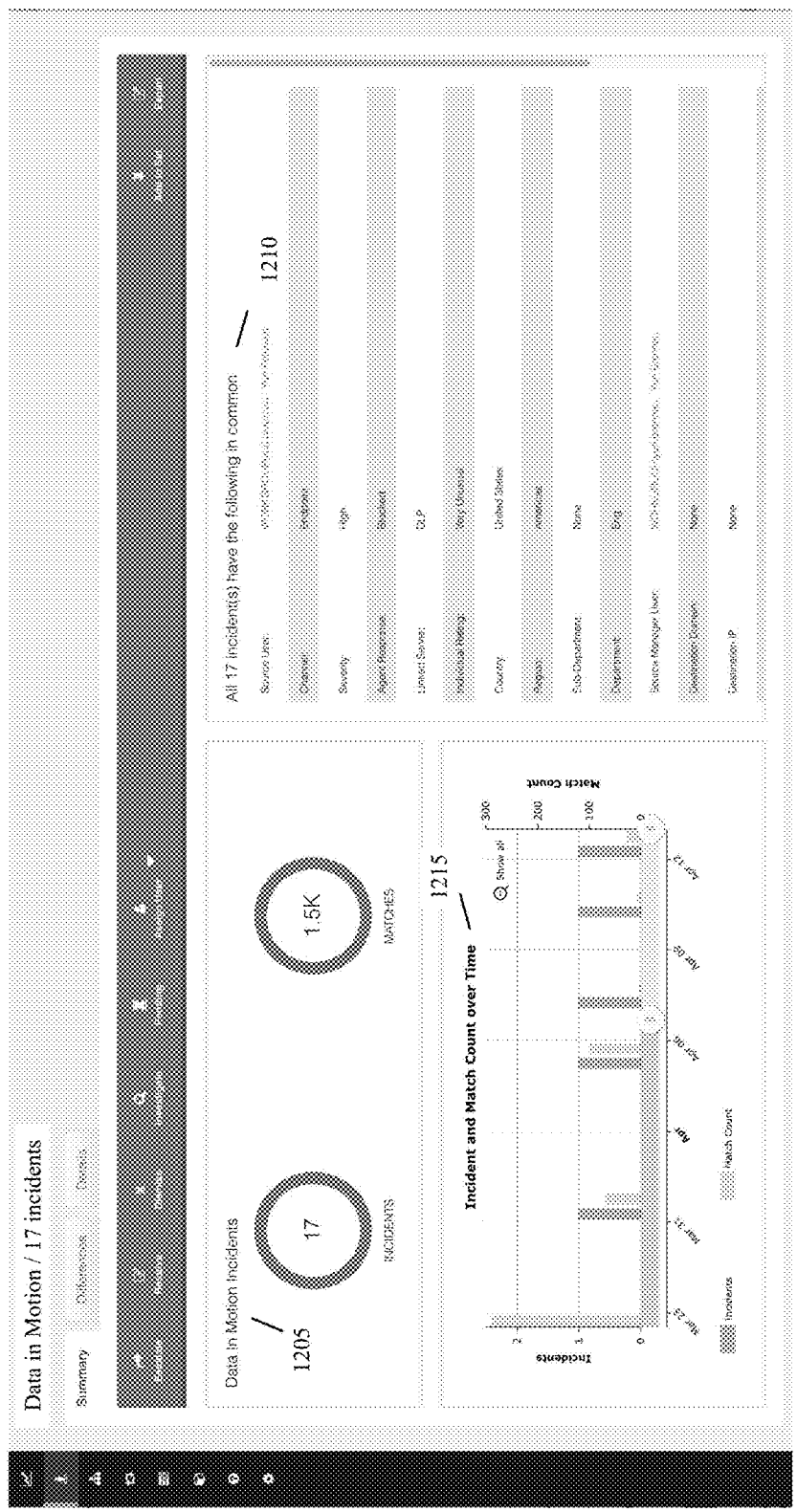
FIG. 12 illustrates a GUI for displaying data in motion events for a selected individual user in some embodiments.

FIG. 12 illustrates a GUI 1200 for displaying data in motion events for a selected individual user in some embodiments. The selected individual user can be the logged-in user or any persons reporting to the user through the organizational management hierarchy.

As shown, the GUI shows DIM incidents 1205 for the selected individual. The GUI also shows the DIM data 1215 over time. The GUI further identifies common parameters 1210 that are shared in the user's DIM incidents.

Referring back to FIG. 9A, the process determines (at 925) whether a request to display and manage risks is received. If not, the process proceeds to 935, which is described below. Otherwise, the process displays (at 930) the risks and the current mitigation status of the identified applications. Some embodiments identify risks for different assets in a computer system. The asset risks include host risks, web risks, application risks, and configuration risks. For each risk, the process in some embodiments displays information such as the first detection time and the last detection of each risk, the location where an application, computer, IP address, or other entity associated with each risk is executed or located. The process further displays the identification of one or more organizational units that use each application associated with a risk.

Figure 13:
FIG. 13 illustrates a GUI for displaying application risks in some embodiments.

Examples of GUIs for displaying host risks were described above by reference to FIGS. 1-5 and 8. An example of a GUI for displaying web risks was described above by reference to FIG. 7. FIG. 13 illustrates a GUI 1300 for displaying application risks in some embodiments. The logged-in user can see applications for which the user or any persons reporting to the user through the organizational management hierarchy are responsible. In this example, the GUI for each application 1310 displays the risk count 1315, residual risk of loss 1320, and the aging of the risks 1325.

Figure 14:
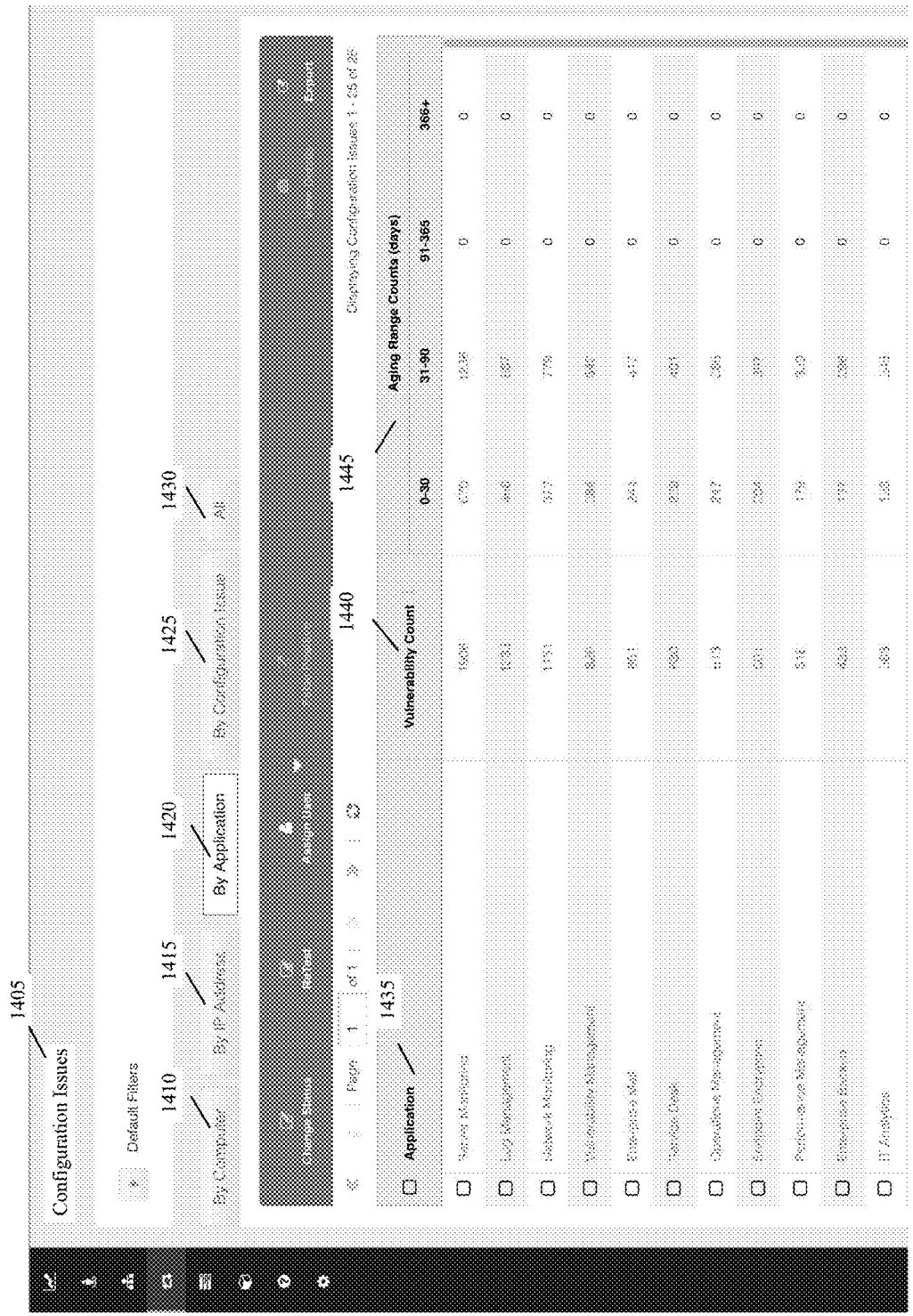
FIG. 14 illustrates a GUI for displaying configuration issues in some embodiments.

FIG. 14 illustrates a GUI 1400 for displaying configuration issues in some embodiments. The logged-in user can see configuration issues for which the user or any persons reporting to the user through the organizational management hierarchy are responsible. The GUI provides different options to view configuration issues for computers 1410, Internet protocol (IP) addresses 1415, and applications 1420. The user can view configuration issues sorted by configuration issue 1425. The user can also view all configuration issues by selecting option 1430. In this example, the GUI for each application 1435 displays the risk count 1440, and the aging of the risks 1445.

Referring back to FIG. 9A, the process determines (at 935) whether a request to add particular risks or users to watch lists is received. If not, the process proceeds to 945, which is described below. Otherwise, the process receives (at 940) a selection of users or risks and adds them to the corresponding watch lists.

FIG. 15 illustrates a GUI 1500 for adding users and risks to watch lists and monitoring statistics regarding the items in the watch list in some embodiments. The logged-in user can add risks for which the user or any persons reporting to the user through the organizational management hierarchy are responsible. The logged-in user can also add herself or any persons reporting to her to a watch list.

In this figure, the user has three watch lists: Payment Card Industry (PCI) Data Security Standard watch list 1550, authentication to PCI servers watch list 1555, and Sarbanes-Oxley Act (SOX) watch list 1550. PCI standards are used by any company that accepts credit card payments either online or offline. These companies have to comply with the PCI rules concerning data security in order to protect cardholder data. In this example, the user has identified different applications, servers, computers, etc., that are sensitive for complying with PCI rules in a watch list. The user also has added the entities relevant to authentication to PCI servers in another watch list 1555.

Sarbanes-Oxley Act is a U.S. federal law that sets requirements for U.S. public company boards, management, and public accounting firms to protect investors from the possibility of fraudulent accounting activities by corporations. In this example, the user has identified different applications, servers, computers, etc., that are sensitive for complying with Sarbanes-Oxley Act in a watch list 1560.

The GUI shows the name 1505 of the watch lists as well as type 1510, owner (or the responsible entity) 1515, number of entities 1520, number of DIM events 1525, number of endpoint (EP) events 1530, number of authentication events 1535, and number of web activities 1540 for each watch list.

Referring back to FIG. 9A, the process determines (at 945) whether a request to assign mitigation tasks has received. If not, the process proceeds to 955, which is described below. Otherwise, the process receives (at 950) assignment of mitigation tasks to the user or to persons managed by the user. The process also receives reassignment of mitigations to/from the user or persons managed by the user. Examples of assigning and reassigning mitigation tasks were described above by reference to FIGS. 3 and 8.

The process also displays the status of each mitigation task. Examples of a mitigation task status include assigned, not assigned, started, in progress, not stated, completed, closed, etc. When a mitigation task is assigned to a person or a group of persons, the method also displays the name of the person or persons that are assigned to apply the mitigation.

Next, the process determines (at 955) whether a request to display risk mitigation scorecards is received. If not, the process proceeds to 965, which is described below. Otherwise, the process displays (at 960) the statistics and scorecards to show the increase or decrease of security risks, threat potentials, and/or residual risk of loss.

Figure 16:
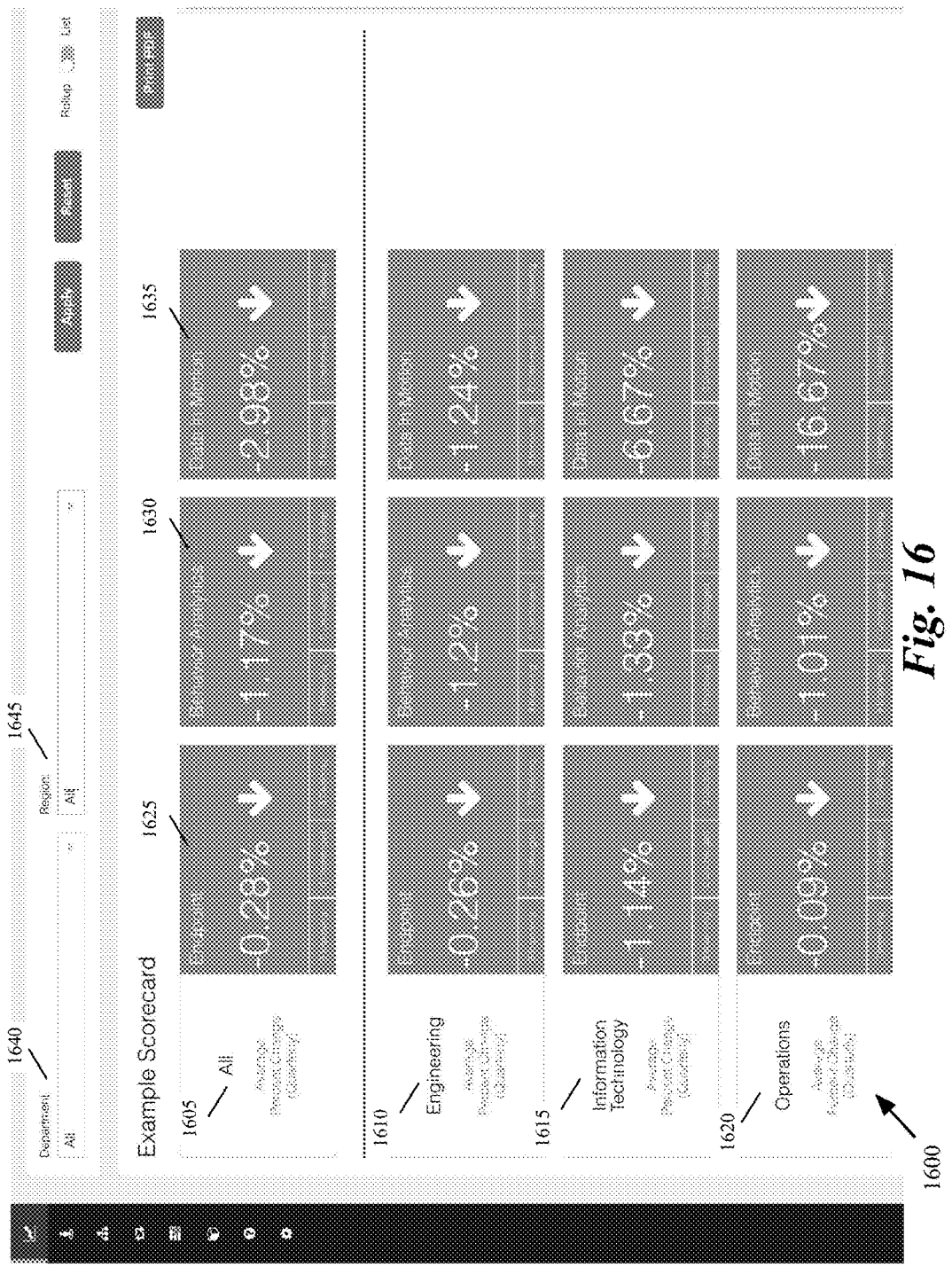
FIG. 16 illustrates a GUI for adding users and risks to displays the statistics and scorecards to show the increase or decrease of security risks, threat potentials, and/or residual risk of loss in some embodiments.

FIG. 16 illustrates a GUI 1600 for adding users and risks to displays the statistics and scorecards to show the increase or decrease of security risks, threat potentials, and/or residual risk of loss in some embodiments. In this example, the user has selected to see the scorecards for all departments 1640 and all regions 1645. For instance, the user is a chief information security officer (CISO) in the organization and uses the scorecards to monitor the progress for reducing the risks, threat potentials, or residual risk of loss. In this example, the percentage of change in the threat potential in different departments 1610-1620 as well as the percentage change of the threat potential for all departments 1605 are displayed.

As shown, for each department, the progress for the threat potential due to endpoint issues 1625, user behavior 1630, and data in motion incidents 1635 is displayed. The user has the option to display scorecards for different metrics such as residual risk of loss as a monetary value, residual risk of loss as a relative number, etc.

Referring back to FIG. 9B, the process determines (at 965) whether a request to log out is received. If yes, the process ends, Otherwise, the process proceeds to 910, which was described above.

III. Assigning Monetary Value to Discrete Risk Levels

Some embodiments provide a method of determining the residual risk of loss due to security risks associated with applications that execute in a computer system. The method uses a set of discrete loss levels and assigns a loss level to each application. The discrete loss levels are used for determining the total residual risk of loss associated with each application should the application be compromised. The discrete loss levels are also used for determining the non mitigated residual risk of loss for each application.

The method in some embodiments associates the discrete loss levels with a monetary loss (e.g., in a currency such as dollar) and calculates the inherent and residual risk of loss as a monetary loss. In other embodiments, the discrete loss levels are used to calculate a relative residual risk of loss for applications.

Figure 17:
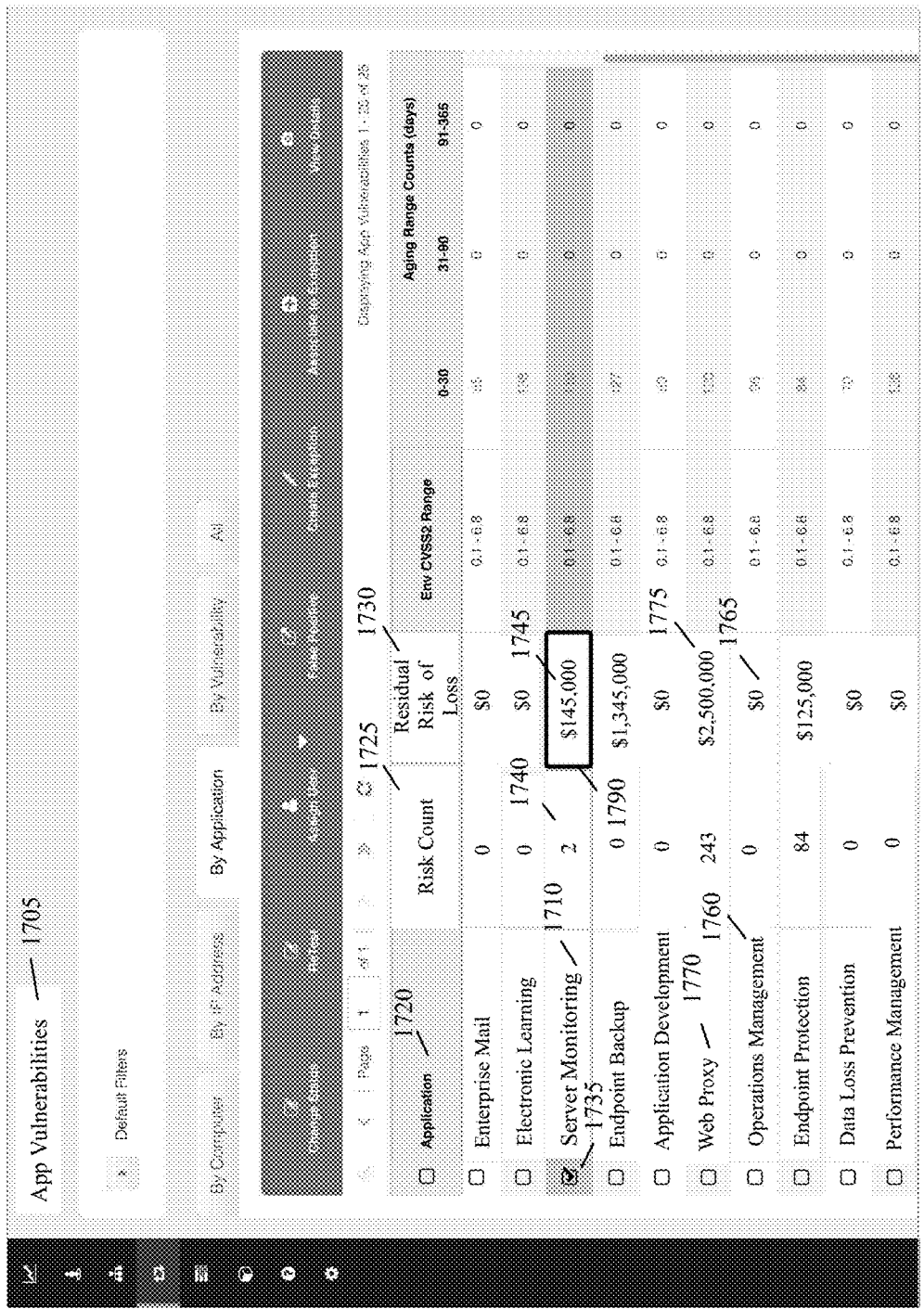
FIG. 17 illustrates a portion of a GUI for displaying application risks in some embodiments.

FIG. 17 illustrates a portion of a GUI 1700 for displaying application risks 1705 in some embodiments. As shown, the GUI displays a list of a set of applications that execute on a computer system of an organization. The GUI shows the name 1720 of each application and other security related information such as risk count 1725, residual risk of loss 1730 associated with each application, etc. In some embodiments, GUI 1700 also shows a total residual risk of loss associated with each application (e.g., when the display area is scrolled all the way to the bottom (not shown).

Each application is associated with a total inherent risk of loss and a residual risk of loss. The total inherent risk of loss of an application is the estimated loss incurred by the organization if the application were compromised. The threat potential of each application depends on risks associated with the application. The residual risk of loss is the non mitigated portion of the inherent risk. The residual risk of loss of an application can be eliminated by mitigating the risks that are identified for the application.

The residual risk of loss can be caused by loss of confidentiality, loss of integrity, and loss of availability of an application. The loss of confidentiality is caused by the compromise of personal identifications of one or more customers. For instance, an exploit of an application may expose the social security numbers, bank accounts, credit card accounts, health records, or any other personal identification.

The loss of integrity of an application includes the lack of one or more security measures to prevent the unauthorized exploit of the application. The loss of availability of an application may cause financial loss. For instance, the loss of availability of a website that generates income or the loss of availability of an application that is used to trade stocks can create financial loss for the organization.

In the example of FIG. 17, several applications, such as operation management application 1760 have residual risk of loss of $0 (as shown by 1765). These applications are applications for which the identified risks are already mitigated. On the other hand, several applications, such as web proxy 1770 have a monetary value stated for residual risk of loss (as shown by 1775).

The example of FIG. 17 also shows a newly installed application, server monitoring application 1710. As shown, two risks 1740 are detected for the application. In the depicted embodiment, a default value for the residual risk of loss is calculated for the new applications. In this example, the default residual risk of loss is $145,000 (as shown by 1745). The residual risk of loss is also visually marked, e.g., by showing a border (as shown by 1790), displaying the loss with a different color, etc., to indicate to the user that the residual risk of loss value is only a default value.

Figure 18:
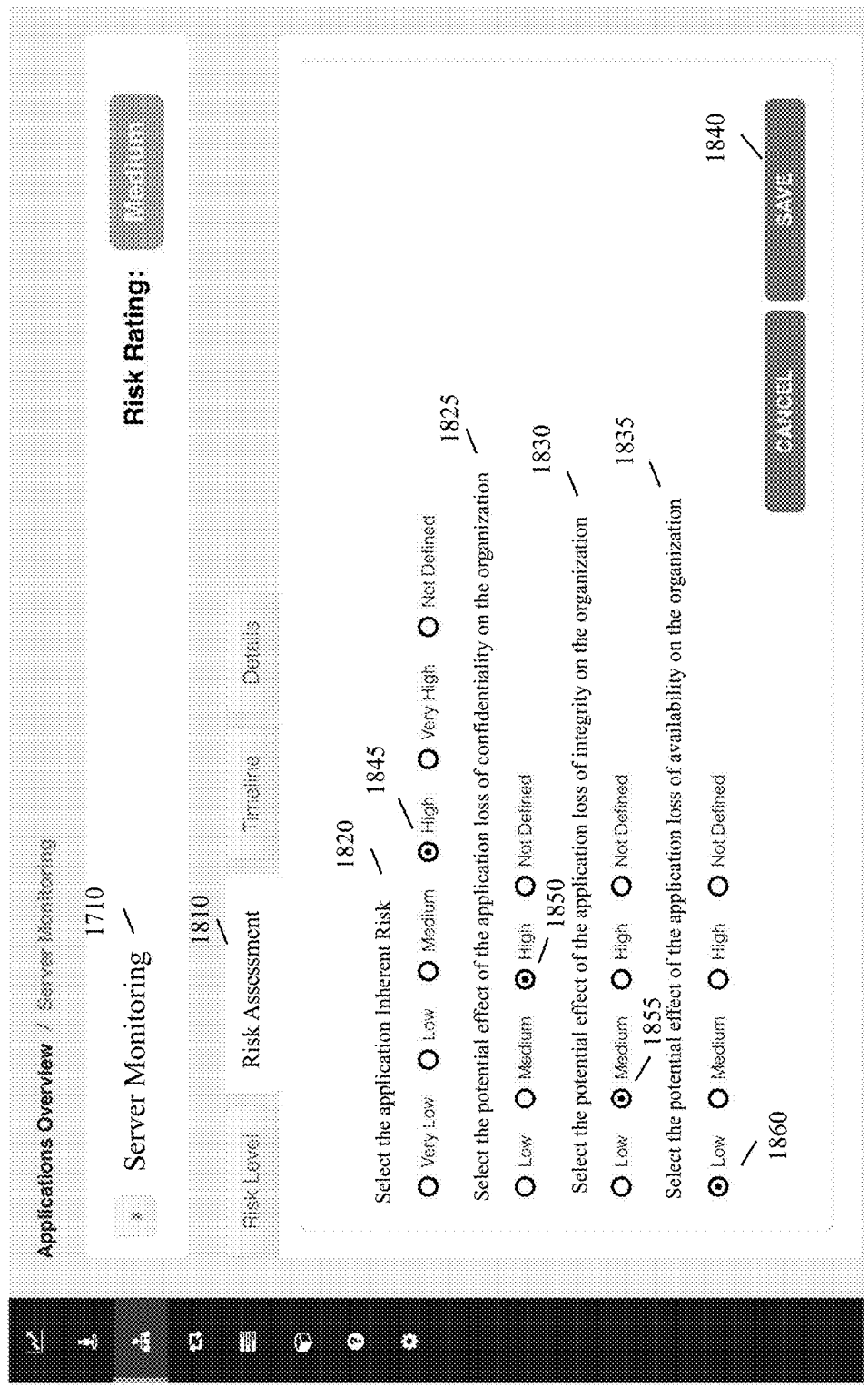
FIG. 18 illustrates a portion of a GUI for assigning risk levels to applications in some embodiments.

In the example of FIG. 17, the user has selected server monitoring application 1710 (as shown by checkmark 1735). FIG. 18 illustrates a portion of a GUI for assigning risk levels to applications in some embodiments. The GUI shows server monitoring application 1710, which was selected in FIG. 17. As shown, the user has selected risk assessment tab 1810 in order to assign discrete risk levels to the application's inherent and residual risks of loss.

The GUI includes a set of selections 1820-1835 and each selection has a set of selectable options. The selectable options in this example are radio buttons that allows the user to choose only one of the options. Selection 1820 provides several options to select a discrete level for the application's inherent risk. In this example, the options are very low, low, medium, high, very high, and not defined. As shown, the user has selected high 1845 as the level to assign to the application's inherent risk.

Selection 1825 provides several options to select a discrete level for the potential effect of the application's loss of confidentiality on the organization. The options in this example are low, medium, high, and not defined. As shown, the user has selected high 1850 as the level to assign to the potential effect of the loss of confidentiality of the application.

Selection 1830 provides several options to select a discrete level for the potential effect of the application's loss of integrity on the organization. The options in this example are low, medium, high, and not defined. As shown, the user has selected medium 1855 as the level to assign to the potential effect of the loss of integrity of the application. Selection 1835 provides several options to select a discrete level for the potential effect of the application's loss of availability on the organization. The options in this example are low, medium, high, and not defined. As shown, the user has selected low 1860 as the level to assign to the potential effect of the loss of integrity of the application.

Once the user has assigned a discrete level to each selection 1820-1835, the user saves the assigned levels by selecting the save button 1840. The user repeats the same process for other applications in FIG. 17. In some embodiments, each application is assigned a default loss level and the user utilizes GUI 1800 to change the loss levels in order to fine tune the estimated inherent and residual risks of loss of each application.

Figure 19:
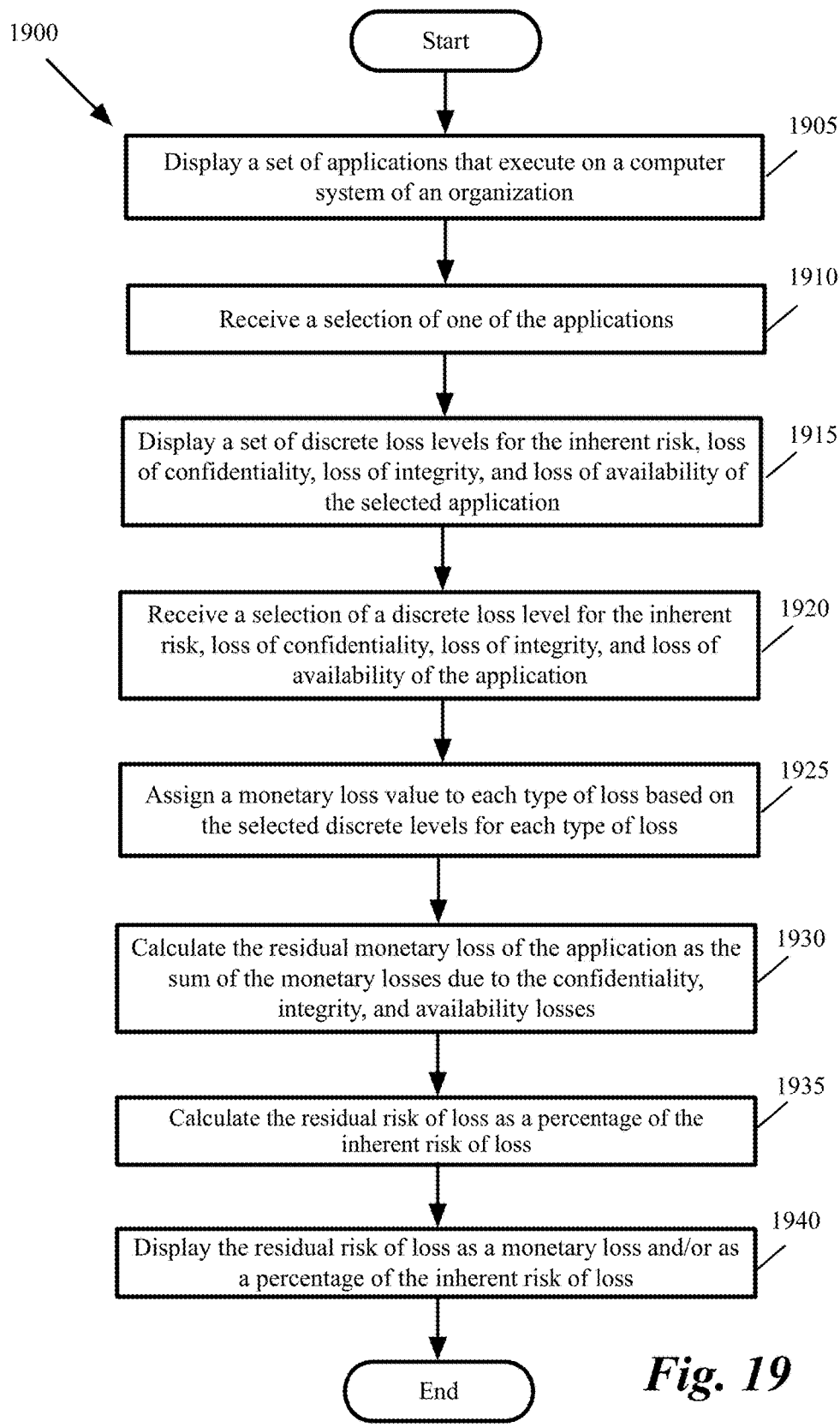
FIG. 19 conceptually illustrates a process for assigning discrete loss levels to an application and estimating a monetary loss for the inherent and residual risk of loss of an application in some embodiments.

FIG. 19 conceptually illustrates a process 1900 for assigning discrete loss levels to an application and estimating a monetary loss for the inherent and residual risks of loss of an application in some embodiments. As shown, the process displays a set of applications that execute on a computer system of an organization. For instance, the process displays applications 1720 as shown in FIG. 17.

The process then receives (at 1910) a selection of one of the applications. For instance, the process selects application 1710 as shown in FIG. 17. The process then displays (at 1915) a set of discrete loss levels for the inherent risk, loss of confidentiality, loss of integrity, and loss of availability of the selected application. For instance, the process displays discrete loss levels associated with selections 1820-1835 in FIG. 18.

The process then receives (at 1920) a selection of a discrete loss level for the inherent risk, loss of confidentiality, loss of integrity, and loss of availability of the application. For instance, the process receives the selection of discrete levels 1845-1860 in FIG. 18. The process then assigns (at 1925) a monetary loss value to each type of loss based on the selected discrete levels for each type of loss. In some embodiments, monetary loss value associated with each loss level is user definable. These embodiments provide a GUI to receive the monetary value associated with each discrete level associated with selections 1820-1835 in FIG. 18.

The process then calculates (at 1930) the residual monetary loss of the application as the sum of the monetary losses due to the confidentiality, integrity, and availability losses. The process also calculates (at 1935) the residual risk of loss as a percentage of the inherent risk. The process then displays (at 1940) the residual risk of loss as a monetary loss and/or as a percentage of the inherent risk. The process then ends.

Figure 20:
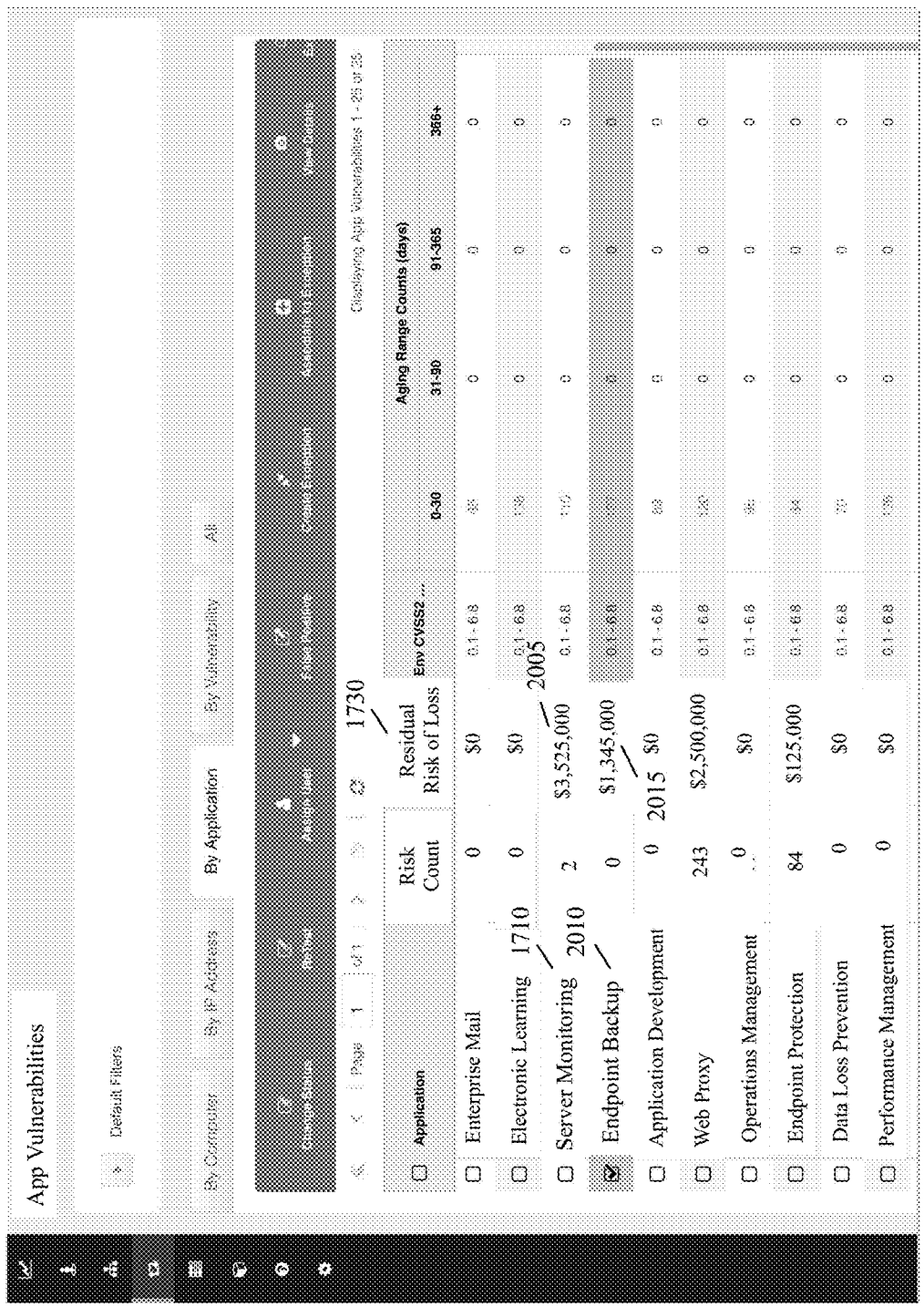
FIG. 20 illustrates the GUI of FIG. 17 after monetary loss is calculated for the server monitoring application.

FIG. 20 illustrates the GUI 1700 of FIG. 17 after monetary loss is calculated for the server monitoring application. As shown, the residual risk of loss 2015 for server monitoring application 1710 is recalculated as $3,525,000 (as shown by 2005) based on the new discrete loss levels entered. The visual marker 1790 (shown in FIG. 17) is also removed to indicate the residual risk of loss is not calculated based on default discrete loss levels.

Some embodiments allow a user to change the loss level associated with each selection 1820-1835 in order to fine tune the loss estimate. The inherent and residual monetary losses are then adjusted based on the new monetary loss assigned to the discrete loss levels. The user in this example has selected endpoint backup application 2010, which currently has a residual risk of loss 2015 of $1,345,000, for changing one or more of the discreet loss levels.

FIG. 21 illustrates the GUI 1800 of FIG. 18 for assigning risk levels to applications in some embodiments. The GUI shows endpoint backup application 2010, which was selected in FIG. 20. As shown, the current setting 2120 for the potential effect of the application loss of availability on the organization is medium.

Figure 22:
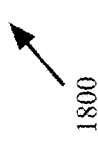
FIG. 22 illustrates the GUI of FIG. 21 after the setting for the potential effect of the application loss of availability on the organization is changed from medium to low.

FIG. 22 illustrates the GUI 1800 of FIG. 21 after the setting 2120 for the potential effect of the application loss of availability on the organization is changed from medium to low. The user save the new settings by selecting the save button 1840.

Figure 23:
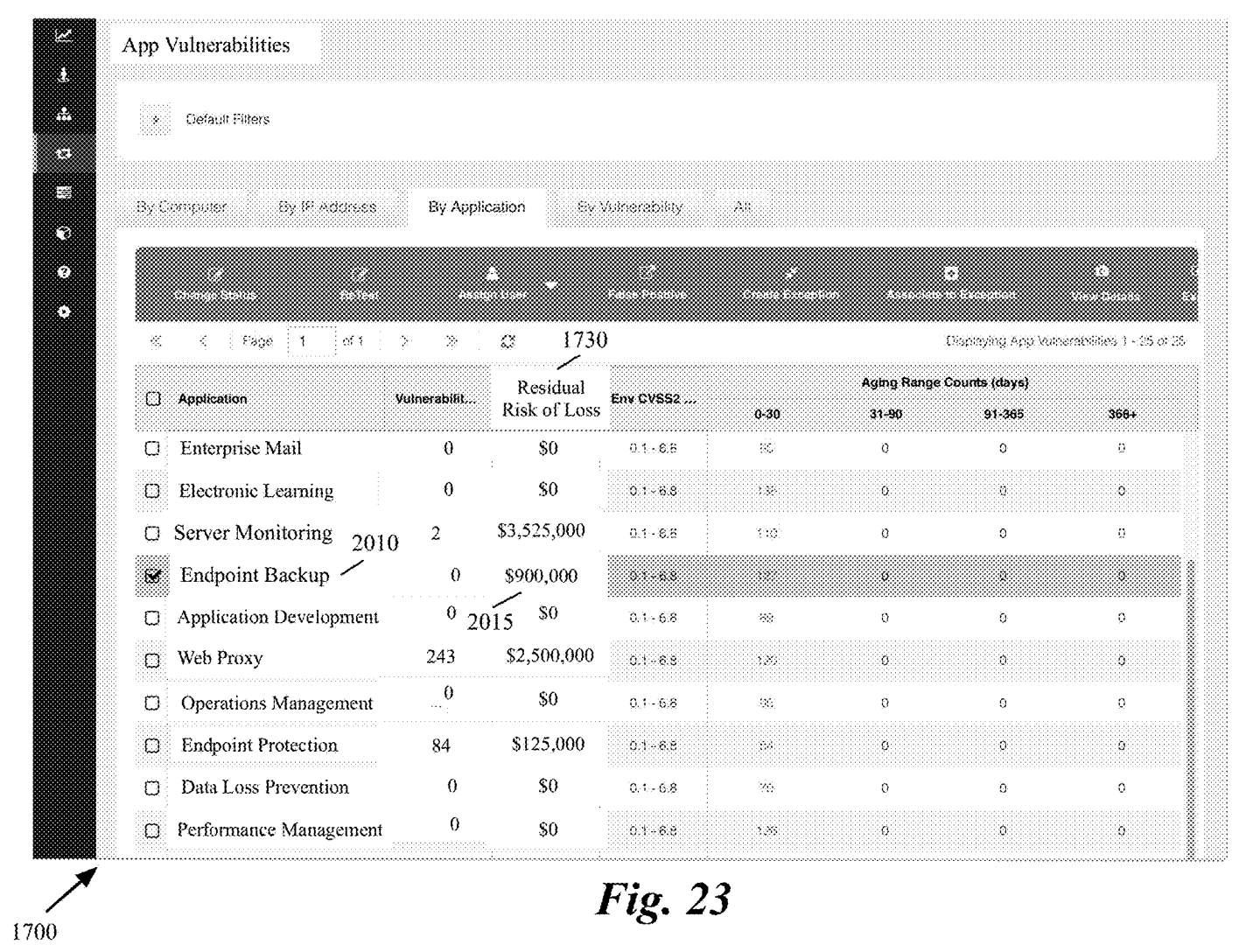

FIG. 23 illustrates the GUI 1700 of FIG. 20 after the discrete level assigned to the application loss of availability on the organization for the endpoint backup application is changed from medium to low. As shown, the residual risk of loss 2015 for endpoint backup application 2010 is recalculated from $1,345,000, as $900,000 based on the new discrete loss level for the application loss of availability.

In the examples of FIGS. 17-23, a monetary loss (e.g., in a currency such as dollar) is associated with the discrete loss levels and the inherent and residual risks of loss are calculated as monetary losses. In other embodiments, the discrete loss levels are used to calculate a relative residual risk of loss for applications. In these embodiments, the residual risk of loss is shown as a relative number (e.g., a number between 1 and 100).

Figure 30:
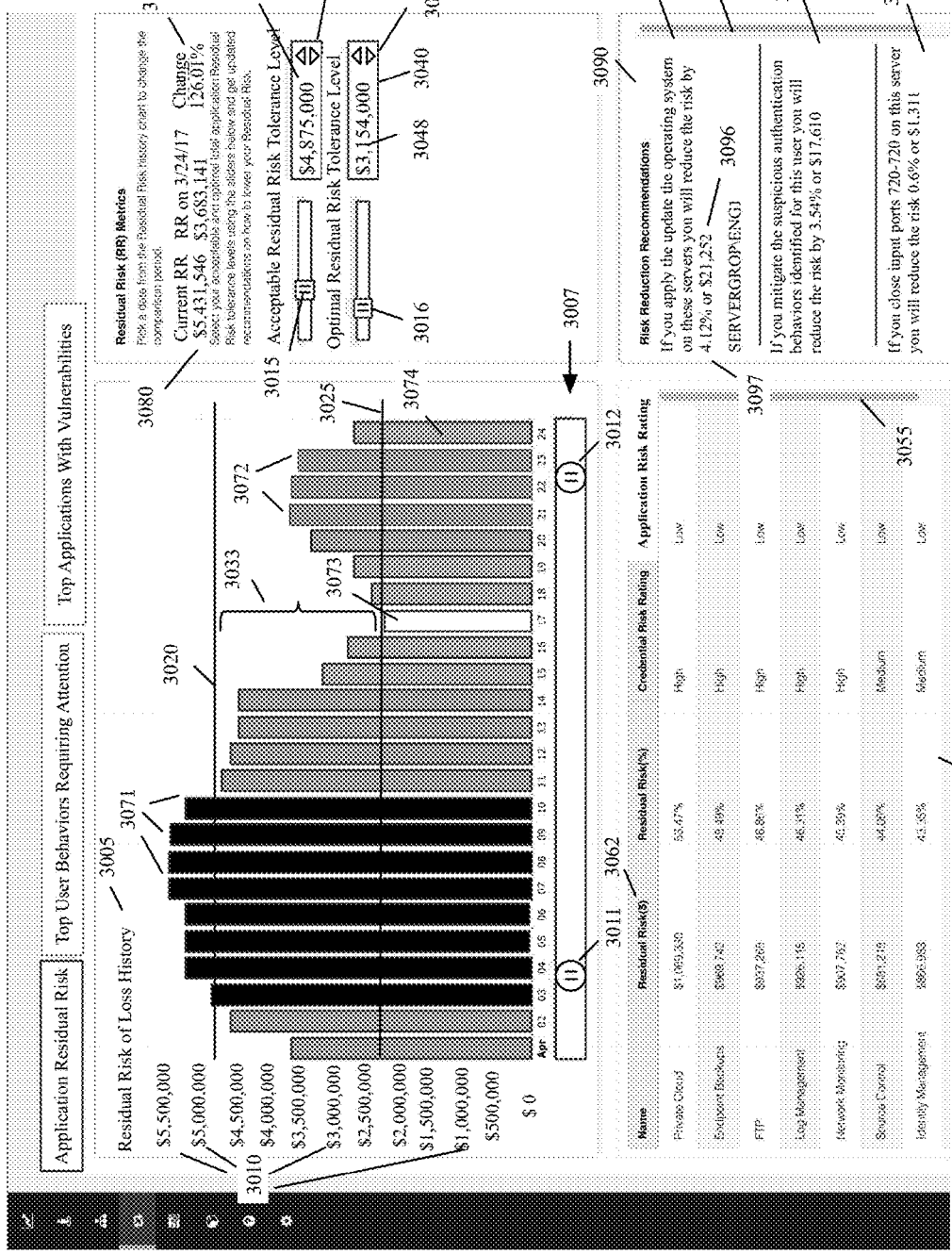
FIG. 30 illustrates a GUI where the residual risk of loss is expressed as a monetary value in some embodiments.

FIG. 30 conceptually illustrates a GUI 3000 where the total residual risk of loss is expressed as a monetary value in some embodiments. Each application in some embodiments is associated with a total inherent risk of loss and a residual risk of loss. The loss associated with the total inherent risk of an application is the estimated possible loss incurred by the organization if the application were exploited. The inherent risk of loss is, therefore, the overall risk of loss for the total exposure of an application.

The residual risk of loss is the non mitigated portion of the inherent risk of loss. The residual risk of loss of an application is the risk of loss of the application that can be eliminated by mitigating the risks that are identified for the application. The non mitigated residual risk of loss for each application in some embodiments is determined as a function of the risk (or loss) due to the threat of the exploit of the application and the probability of occurrence of the exploit (or the exploit potential) determined by monitoring the application executing on the computers in the computer system.

As shown, the non mitigated residual losses of loss 3010 are shown as monetary values. In addition, the residual risk of loss 3062 associated with each security risk in display area 3050 is shown in as monetary value. The non mitigated residual risk of loss in some other embodiments is displayed as a relative number. Yet, in other embodiments, the GUI displays the non mitigated residual risk of loss as a percentage of the total inherent risk of loss.

The GUI shows the residual risk of loss history 3005 for the applications executing on the organization computer system. The sum of the residual risk of loss for all applications is drawn for a group of points over a time interval 3007. Two controls 3011-3012 (e.g., two sliders) are used to adjust the start and end of the period. Moving the two sliders closer to each other reduces the number of points (and the number of displayed bars 3071-3074) in the time interval. Although the residual risk of loss is shown on a daily basis, it should be understood that the history could be shown over any other unit of time (e.g., weeks, months, quarters, etc.).

The GUI also includes two controls (e.g., two sliders) 3015-3016. Control 3015 is used to set an acceptable residual risk of loss tolerance level. This is the maximum amount of residual risk of loss (or the worst-case scenario) that the user, or the organization for which the user works, is willing to take. This limit is shown as a level 3020 on the GUI.

As the user changes control 3015, the GUI displays the acceptable amount of residual risk of loss that corresponds to the position of the level 3020 in a display area 3030. The user can also type the acceptable amount of residual risk of loss in area 3030, e.g., to fine tune the amount. The user can also use up and down arrows 3035 to increment or decrement the acceptable amount of residual risk of loss.

Control 3016 is used to set an optimal residual risk of loss tolerance level. This is the ideal amount of residual risk of loss that the user, or the organization, ideally wants to take. This limit is shown as a level 3025 on the GUI. As the user changes control 3016, the GUI displays the optimal amount of residual risk of loss that corresponds to the position of the level 3025 in a display area 3040. The user can also type the acceptable amount of residual risk of loss in area 3040, e.g., to fine tune the amount. The user can also use up and down arrows 3045 to increment or decrement the optimal amount of residual risk of loss.

The GUI also includes a display area 3050 that displays information for the identified security risks. A scroll bar 3055 scrolls the list of security risks in the display area 3050. The information displayed for each security risk in this example includes name 3061, residual risk 3062, residual risk of loss as a percentage 3063 of the inherent risk of loss, credential risk of loss rating 3064, and application risk of loss rating 3065. Credential (or authentication) risk of loss rating is the risk of loss associated with credential events. Application risk of loss rating is associated with risks, vulnerabilities, configuration issues, data in motion (DIM) incidents, web activates, etc., that are cause by a technical flaw and/or exploited by software, malware, worms, etc.

As shown, the residual risk of loss in several points of time 3071 has been over the acceptable residual risk of loss tolerance level 3020. The residual risk of loss in at least one other point of time 3073 has been below the optimal residual risk of loss tolerance level 3025. Also, the residual risk of loss in several points of time 3072 has been between the acceptable residual risk of loss tolerance level 3020 and the optimal residual risk of loss tolerance level 3025.

Each one of these three category of residual risk of loss are visually distinguished from the other two category (e.g., with different color or different shade) in order to help visualize the level of residual risk of loss at each period of time. As shown, the residual risk of loss 3074 in April 24 is shown to be between the two levels 3020 and 3025. The GUI also displays the current value of residual risk of loss 3080 and the percentage of change 3082 since another period of time (in this example March 24).

The current residual risk of loss 3080 is expressed as a monetary loss (or exposure value). The acceptable residual risk of loss tolerance level 3035 and the optimal residual risk of loss tolerance level 3048 are also expressed as monetary values. Furthermore, the amounts of the reduction of the risk by the proposed remedies 3091-3093 in display area 3090 are expressed as monetary values.

The acceptable residual risk of loss level 3020 and the optimal residual risk of loss level 3025 create a range 3033 of risk levels. As shown, the residual risk of loss 3074 in April 24 (in this example the current residual risk of loss) is inside the range 3033 between levels 3020 and 3025.

In some other embodiments, the GUI provides a percentage of reduction in the residual risk of loss that is required to make the monetary loss (or exposure value) associated with the current residual risk of loss 3074 to change from exceeding the range to be below the range. The GUI further displays a percentage of reduction in the residual risk of loss value required to make the current residual risk of loss to change from being within the range to be below the range.

The GUI also includes a display area 3090 for displaying a set of remedies to apply to one or more identified security risks in order to reduce the residual risk of loss. As described further below, some embodiments analyze the identified security risks and their associated residual risk of loss either as a percentage of the total risk of loss, as a relative number, or as a monetary value. A remedy for each security risk is then identified. The remedies are then sorted based on the amount of reduction each remedy would cause in the residual risk of loss. The prioritized list of remedies is then displayed in display area 3090 (e.g., with the remedy with the highest reduction in the residual risk of loss displayed on the top).

As shown, several remedies 3091-3093 are displayed. A scroll bar 3099 scrolls the list of remedies in the display area 3090. It should be understood that once the user selects a remedy the GUI updates the residual risk of loss based on the assumption that the remedy will be applied to the corresponding security risk and the security risk will be mitigated once the remedy is applied. The GUI presents the scenario where the remedy is applied in order to show the user the effect of applying the remedy.

In some embodiments, the GUI displays an updated residual risk of loss after the selection of a remedy. In some embodiments, the GUI displays the reduction in the residual risk of loss associated with each displayed remedy. For instance, the GUI in FIG. 30 indicates a percentage of reduction 3097 as well as a monetary value reduction 3096 to the total residual risk of loss associated with each proposed remedy 3091-3093.

IV. Determining Security Threat Potentials

The GUIs and processes described above are utilized in a system for determining the residual risk of loss associated with the threat potentials of applications that execute on an organization's computer system. Some embodiments determine the residual risk of loss by identifying security risks in a computer system. The residual risk of loss for the occurrence of each security threat (or the security threat event) is then computed as a function of the probability of the event taking place and the potential financial loss if the event occurs. The residual risk of loss expresses the potential financial loss if the event happens.

Figure 24:
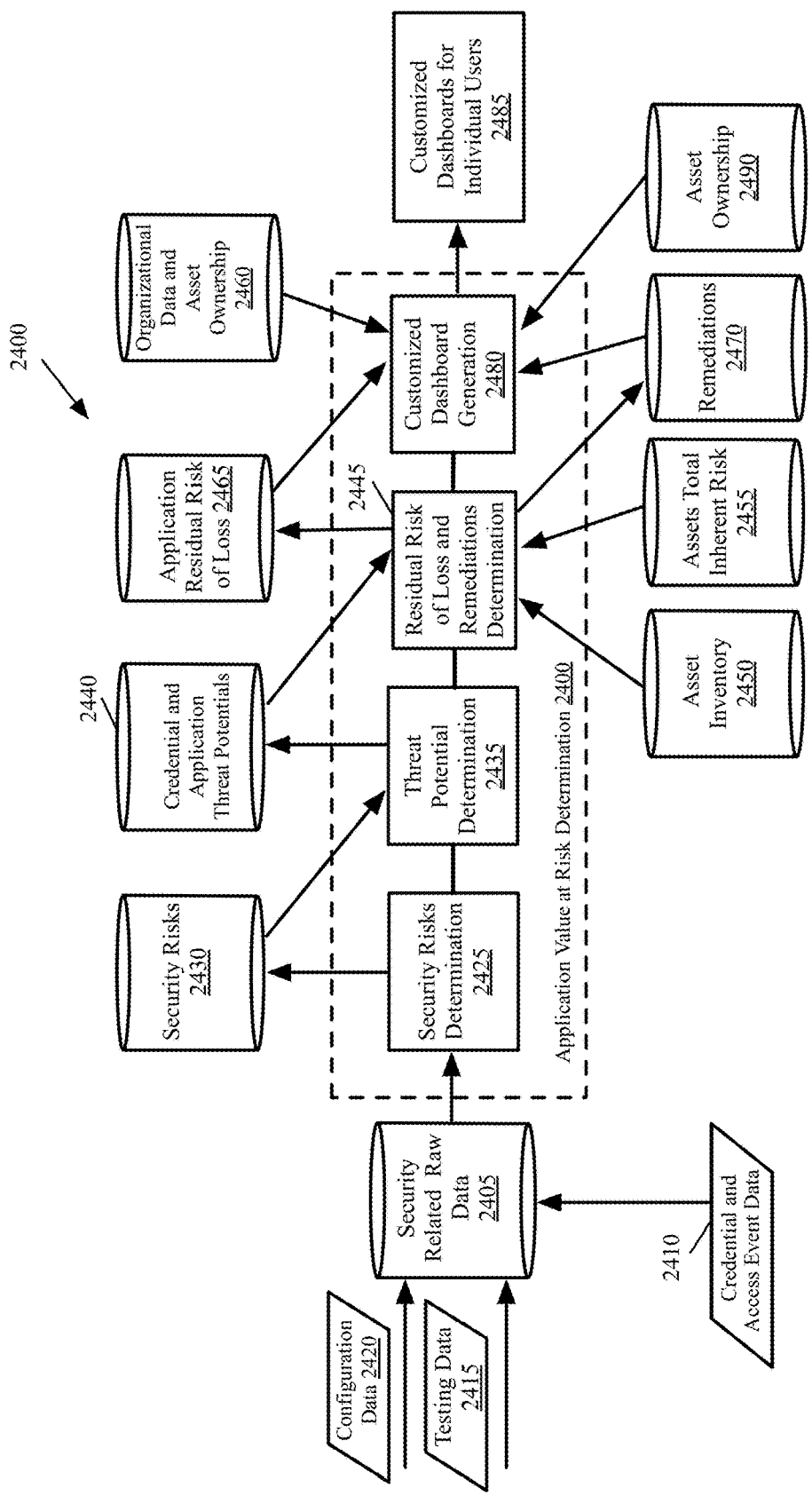
FIG. 24 conceptually illustrates a system for determining the residual risk of loss of different applications in some embodiments.

FIG. 24 conceptually illustrates a system 2400 for determining the residual risk of loss of different applications in some embodiments. As shown, the system includes a security risk determination subsystem 2425, a threat potential determination subsystem 2435, a residual risk of loss and remediation determination subsystem 2445, and a customized dashboard generation subsystem 2480. The system receives security related data and determines the residual risk of loss (or the value at risk) for each application and provides prioritized remediations.

In order to determine the residual risk of loss, different metrics from the computer system are used. The metrics include the inventory of the assets in the computer system, the risks identified in the assets, the estimated loss incurred for each asset if the asset were exploited, the probability and criticality of each risk, the real-time telemetry about user behaviors in relation to cyber security policies, the event data regarding adding or removing security checkpoints for different applications, the configuration and the current version of the applications, the configuration of computers in the computer system, collected indicators of attacks and compromise, etc.

As shown, security related data 2410-2420 is collected from different sources in an organization's computer system and stored as raw data 2405. The security related data includes credential and access event data 2410, testing data 2415, and configuration data 2420. Examples of different systems and methods for collecting security related data are provided further below.

Credential and access event data 2410 includes data collected from user authentication requests as well as automatic access requests (e.g., attempts to access a public website). Metrics such as identification of the user, whether a request is initiated from inside or outside of the computer system, the applications and the type of data accessed, the date and time of an authentication request, and whether data was transferred to a computer inside or outside the computer system are collected.

Testing data 2415 includes data collected during different testing and audits that are performed by the organization in order to assess and prevent different cyber security risks. Configuration data 2420 includes the event data regarding adding or removing security checkpoints for different applications, configuration data collected from log files, operating systems, network controllers, etc.

The collected metrics are correlated and analyzed by security risk determination subsystem 2425 to identify security risks 2430. Threat potential determination subsystem 2435 determines credential and application threat potentials 2440 based on the probability of occurrence of the security risks 2430.

Residual risk of loss and remediation determination subsystem 2445 uses the credential and application threat potentials 2440, the inventory 2450 of the assets in the computer system, and the assets total inherent risk (i.e., the estimated maximum loss incurred for each asset if the asset were exploited) 2455 to determine the residual risk of loss 2465 for each application. Residual risk of loss and remediation determination subsystem 2445 also provides a list of remediations 2470 that are prioritized based on the reduction in the residual risk of loss should a remediation be implemented.

Customized dashboard generation subsystem 2480 utilizes the organizational data and asset ownership 2460 (e.g., the information in the organization's directory service), asset ownership list 2490 that shows the persons responsible for mitigation of risks in different applications and systems in the organization, and the list of remediations 2470 and provides customized dashboards 2485 for individual users based on their responsibilities. For instance, customized dashboard generation subsystem 2480 provides the personalized GUIs described in the previous sections. Different components of the application value at risk determination system 2400 are described in the following sections.

A. Identifying Security Risks

The security risks in some embodiments are determined based on the actual conditions in the computer system. For instance, data regarding different security related events and configurations are collected in the computer system. This data is collected by continuously monitoring the computer system environment in order to identify the potential for compromise in the system.

Figure 25:
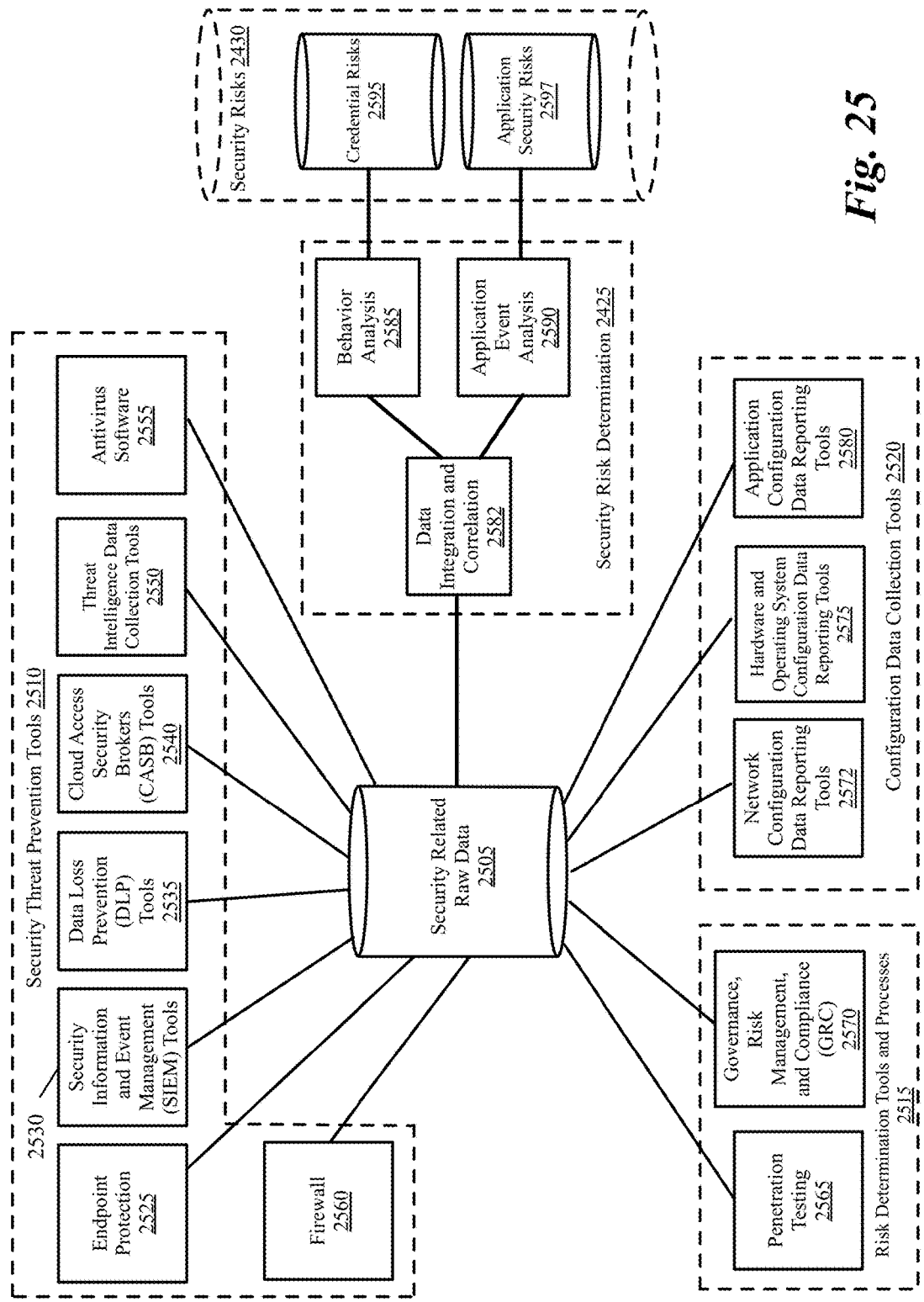
FIG. 25 conceptually illustrates a system that receives security related event data and determines threat potentials in some embodiments.

FIG. 25 conceptually illustrates a system that receives security related event data and determines threat potentials in some embodiments. Security related raw data 2505 is collected from several different sources. Examples for the sources of security related raw data include security threat prevention tools 2510, risk determination tools and processes 2515, and configuration data collection tools 2520. These tools and processes generate log files and reports that are retrieved and examined in order to determine the actual security risks.

The security threat prevention tools 2510 are used to collect authentication and access related data. Examples of security threat prevention tools include endpoint protection tools 2525, security information and event management (SIEM) tools 2530, data loss prevention (DLP) tools 2535, cloud access security brokers (CASB) tools 2540, threat intelligence data collection tools 2550, antivirus software 2555, and firewall 2560.

Endpoint protection tools 2525 are utilized to protect computer systems from possible threats by the devices that remotely access the computer system. SIEM tools 2530 are utilized to capture logs and reports for security compliance purposes. SIEM tools are also utilized for authentication and proxy data collection in order to collect data for direct authentication requests and authentication requests through proxies.

DLP tools 2535 are used to prevent the users from sending sensitive data outside an organization's network. CASB tools 2540 are utilized to provide security when an organization uses an outside cloud provider infrastructure.

Threat intelligence data collection tools 2550 are used to collect data about possible cyber security threats. Antivirus software 2555 is used to detect and remove computer viruses and malware. Firewalls 2560 are used to control the incoming and outgoing packets in a computer network by enforcing a set of security rules.

Enterprises also utilize tools for determining risks in their computer system. Examples of these tools 2515 include penetration testing (or pen testing) tools 2565 and governance, risk management, and compliance (GRC) tools 2570. Pen testing is the voluntary testing of a computer system to identify the weak points that may be exploited by attackers. Pen testing is done by attempting to attack the system through identified weak points both from outside of the system and from the inside of the system and reporting the results. Pen testing can be used both by automated software tools an/or manually. In either case, log files and reports are generated that can be retrieved and examined.

GRC refers to the processes and tools that an organization utilizes in order to meet the organization's objectives. An organization's management and board of directors establish and execute processes and procedures to adhere to the organization's goals. Risk management involves using tools and procedures to identify and manage risks. Compliance involves adhering to rules, regulations, and laws governing the organization's business as well as the internal policies and procedures established by the organization's management and board of directors.

Examples of configuration data reporting tools 2520 include network configuration data reporting tools 2572, hardware and operating system configuration data reporting tools 2575, and application configuration data reporting tools 2580. Network configuration is typically done by configuration tools that provide user interface for a network administrator to configure the network. These tools generate logs and provide tools for retrieving and examining the network configuration. Similarly, application vendors or the operating systems provide tools to configure applications. These tools also generate logs and reporting tools provided by the vendors and/or operating systems allowing for the retrieval and examination of the application configuration.

Tools and processes 2525-2580 collect data for authentication, access, and proxy events for different applications. The security related data in some embodiments is collected by directing a set of machine-executable processes to examine the operating environment of the applications while the applications are executing. In some embodiments, the event data is stored and the stored data 2505 is then used by security risk determination subsystem 2425 for analyzing and identifying the security issues and risks 2430. In other embodiments, security related data is analyzed and the security risks 2430 are identified as the event data is collected while the applications are executing on the computer system.

As shown, security risk determination subsystem 2425 includes several components: Data integration and correlation 2582, behavior analysis 2585, and application event analysis 2590. Data integration and correlation component 2582 consumes data from multiple sources 2525-2580 into a common data model. Instead of creating the replica of the source data (e.g., using the schema for a particular tool or process 2525-2580), data integration and correlation component 2582 uses a schema of the common data model with all possible correlations of the security related data. Data from different sources 2525-2580 is then mapped into the common data model. The use of the common data model allows building the analysis logic into the common model independent of the sources of data. The common data model allows the data to be combined and correlated.

Figure 26:
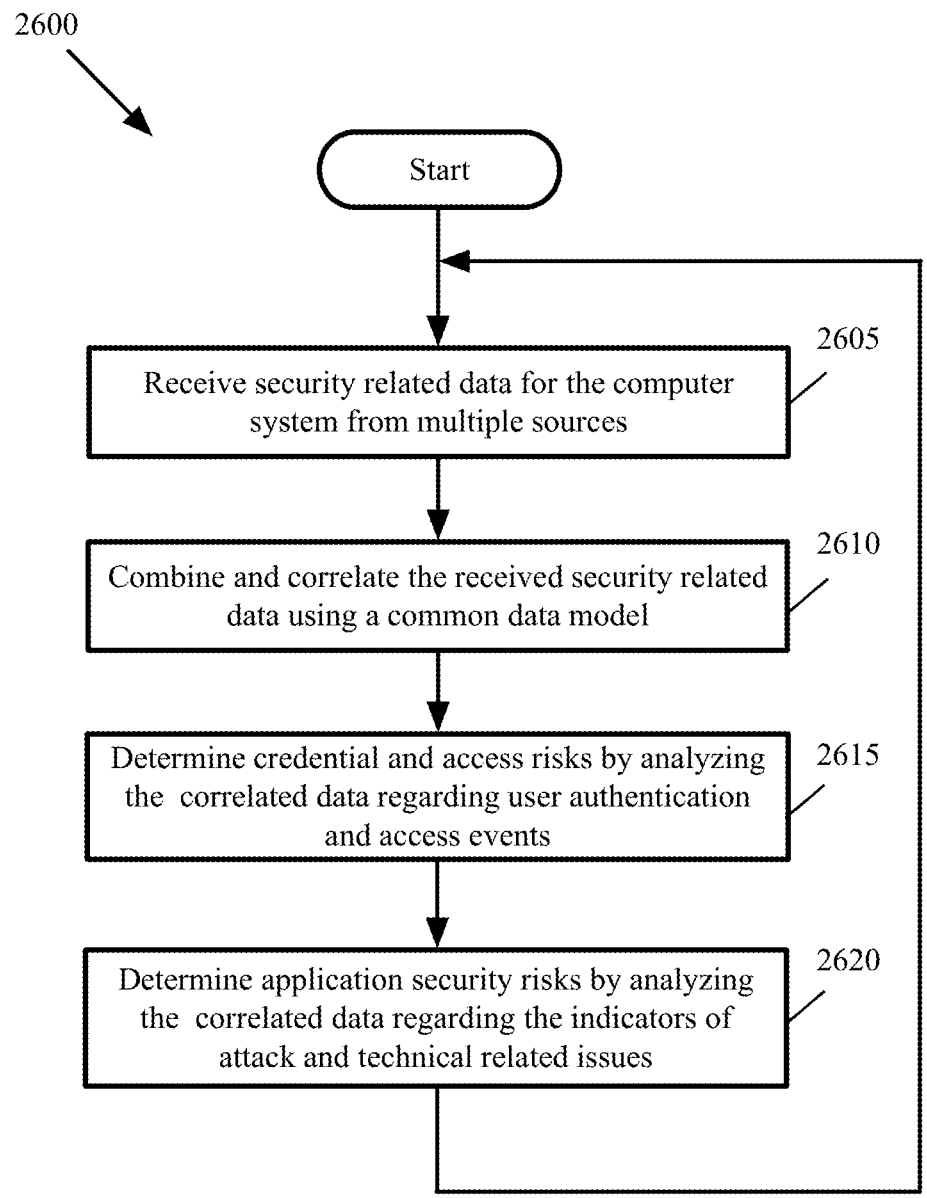
FIG. 26 conceptually illustrates a process for receiving security related event data and determining threat potentials in some embodiments.

FIG. 26 conceptually illustrates a process 2600 for receiving security related event data and determining threat potentials in some embodiments. The process in some embodiments is performed by the security risk determination component 2425 shown in FIGS. 24 and 25. As shown, the process receives (at 2605) security related data for the computer system from multiple sources. For instance, the process receives security related raw data 2505 from tools and processes 2525-2580 at security risk determination component as shown in FIG. 25.

The process then combines and correlates (at 2610) the received security related data using a common data model. For instance, the data integration and correlation component 2580 in FIG. 25 maps the security related raw data 2505 into a common model. The method then determines (at 2615) credential and access risks by analyzing the correlated data regarding credential events. For instance, behavior analysis component 2585 in FIG. 25 analyzes the correlated data regarding user authentication and access events and determines credential risks 2595.

The method then determines (at 2620) application security risks by analyzing the correlated data regarding the indicators of attack and technical related issues. For instance, application event analysis component 2590 in FIG. 25 analyzes the correlated data regarding the indicators of attack and configuration issues to identify application (or application-) security risks 2597. The event data regarding application security risks includes adding or removing security checkpoints for different applications, the configuration and the current version of the applications, the configuration of computers in the computer system, and collected indicators of attacks and compromise.

The method optionally stores credential issues and risks, and application security risks. For instance, the identified security risks 2430 in FIG. 25 are stored for further analysis. The method then proceeds to 2605, which was described above. The method in some embodiments continuously updates the identified security risks.

In some embodiments, the threat potential of an application includes credential-threat potential and application-threat potential. The credential-threat potential is caused by a user who is granted access to the organization's network and attempts to gain access to an application to perform intended or unintended activities that are not authorized for that user. Application (or technical) threats are caused by flaws in the system that cause an application to be exploited by entities (persons or processes) that are not granted access to the organization's network or to the application.

B. Determining the Threat Potential

In some embodiments, the threat potential of an application includes credential-threat potential and application-threat potential. The credential-threat potential is caused by a user who is granted access to the organization's network and attempts to gain access to an application to perform intended or unintended activities that are not authorized for that user. Application threats are caused by flaws in the system that cause an application to be exploited by entities (persons or processes) that are not granted access to the organization's network or to the application.

Figure 27:
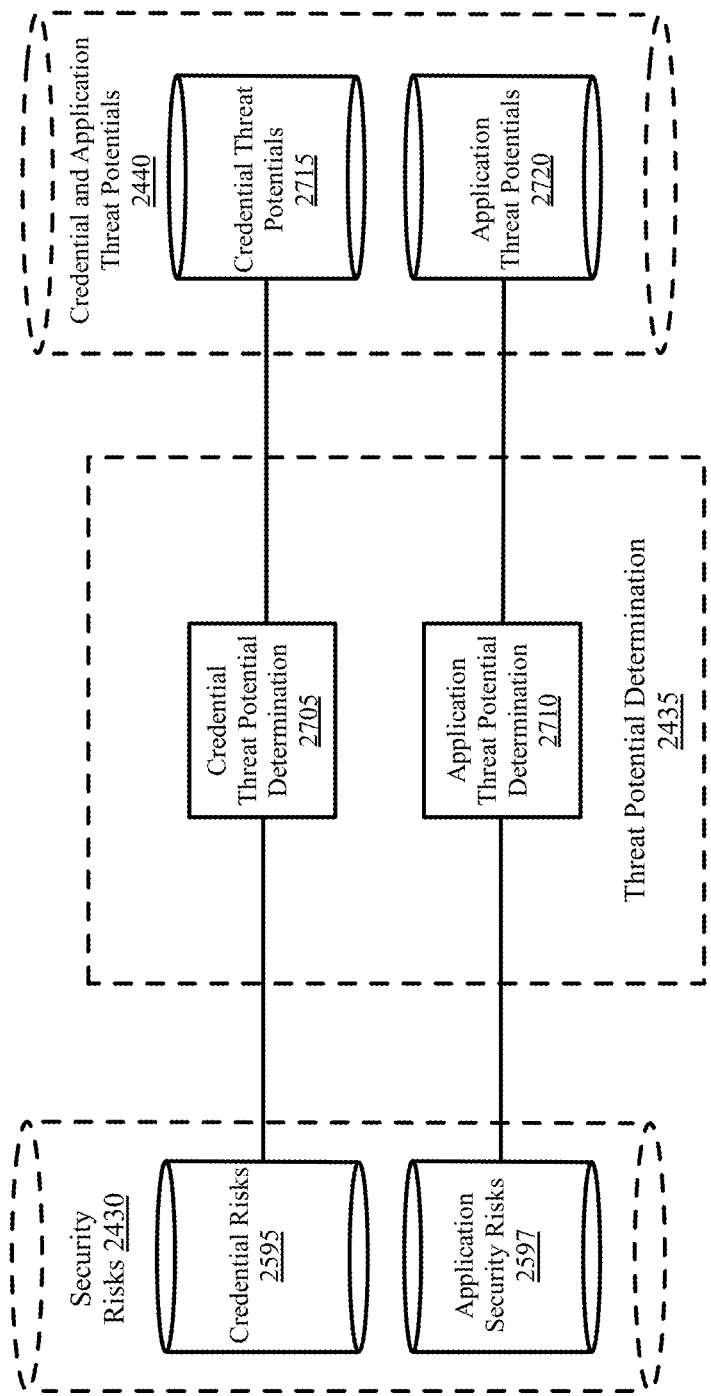
FIG. 27 conceptually illustrates a system for determining application-threat potentials in a computer system in some embodiments.

FIG. 27 conceptually illustrates a system for determining application-threat potentials in a computer system in some embodiments. The figure shows the threat potential determination component 2435 of FIG. 24. As shown, the threat potential determination component includes a credential-threat potential determination component 2705 and an application-threat potential determination component 2710.

The credential threat are caused by unauthorized or unintended activities of users who are granted access to a portion of the organization's network and subsequently perform activities that intentionally or unintentionally compromise one or more applications. Examples of such activities include retrieval of data, modification of data, sending data to entities outside of the organization's network, performing financial transactions, unauthorized or unintended changing of the configuration of an application, etc.

As shown in FIG. 27, credential-threat potential determination component 2705 receives credential risks 2595 and determines credential-threat potentials 2715. The credential-threat events are identified by comparing a set of parameters associated with each user-initiated event with historical parameters maintained for other events initiated by the same person. The historical parameters include the time of the day each particular type of event is initiated by the person or the type of events initiated by the same person. The credential-threat events are also identified by comparing different parameters of each event initiated by a particular person with historical parameters maintained for events initiated by the peers of the particular person. Examples of the peers of a user include persons working in the same organizational unit such as the same group or the same department, persons managed by the same manager, and persons performing similar tasks in the organization. The credential-threat events are further identified by determining whether an access requested by a person has received an authorization from a local computer or has received an inbound authorization from a standalone computer.

As shown in FIG. 27, application-threat potential determination component 2710 receives application security risks 2597 and determines application-threat potentials 2720. Application threats include threat of using flaws in the configuration of applications as well as flaws in the configuration of computer platforms that run the applications and the network equipment used to communicate with the applications. The flaws also include weaknesses or lack of protections mechanisms such as firewalls or antivirus for accessing the applications.

Examples of configuration flaws include an out of date version of an application that is known to be prone to external attacks, an out of data operating system running on a computer that is used to execute an application, an unprotected ingress port of a computer where an application runs, a guest account with a default password on a user's computer, out of date (or lack thereof) encryption on outbound data, etc.

C. Determining the Residual Risk of Loss for Applications

Figure 28:
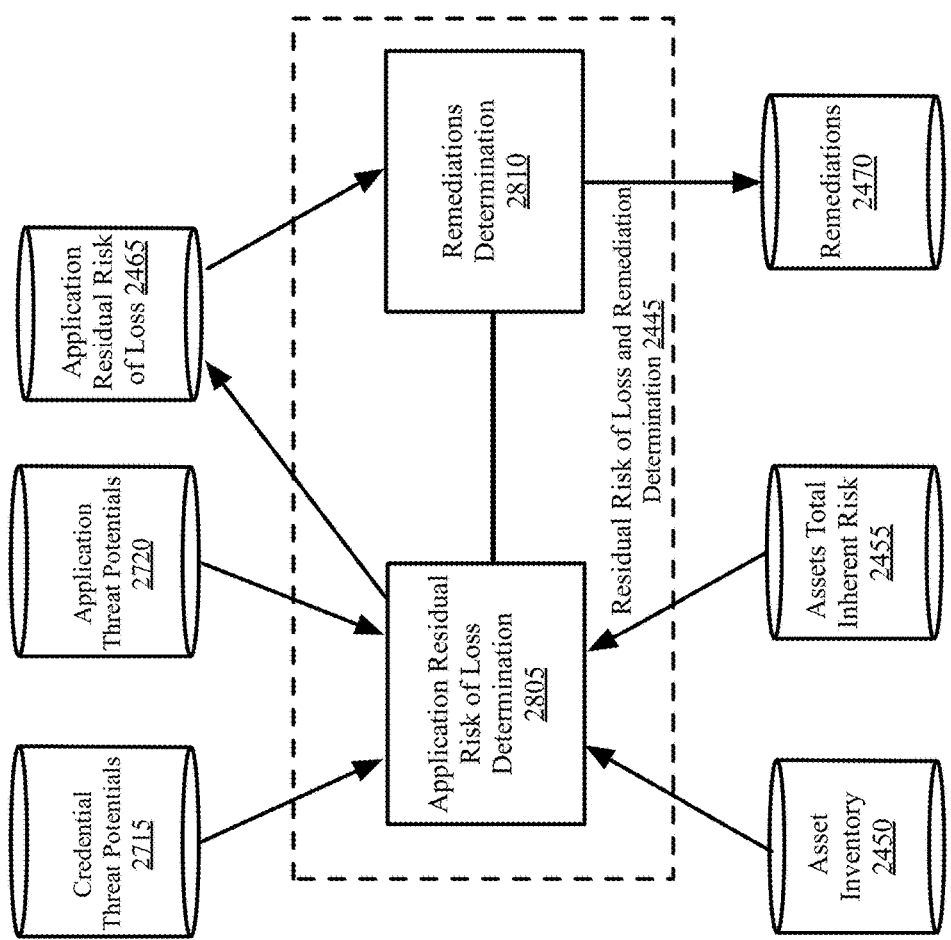
FIG. 28 conceptually illustrates a system for determining the residual risk of loss for applications that execute in a computer system in some embodiments.

In order to determine the residual risk of loss, different metrics are collected from the computer system. FIG. 28 conceptually illustrates a system for determining the residual risk of loss for applications that execute in a computer system in some embodiments. As shown, the residual risk of loss and remediation determination subsystem 2445 includes an application residual risk of loss determination component 2805 and a remediation determination component 2810.

Figure 29:
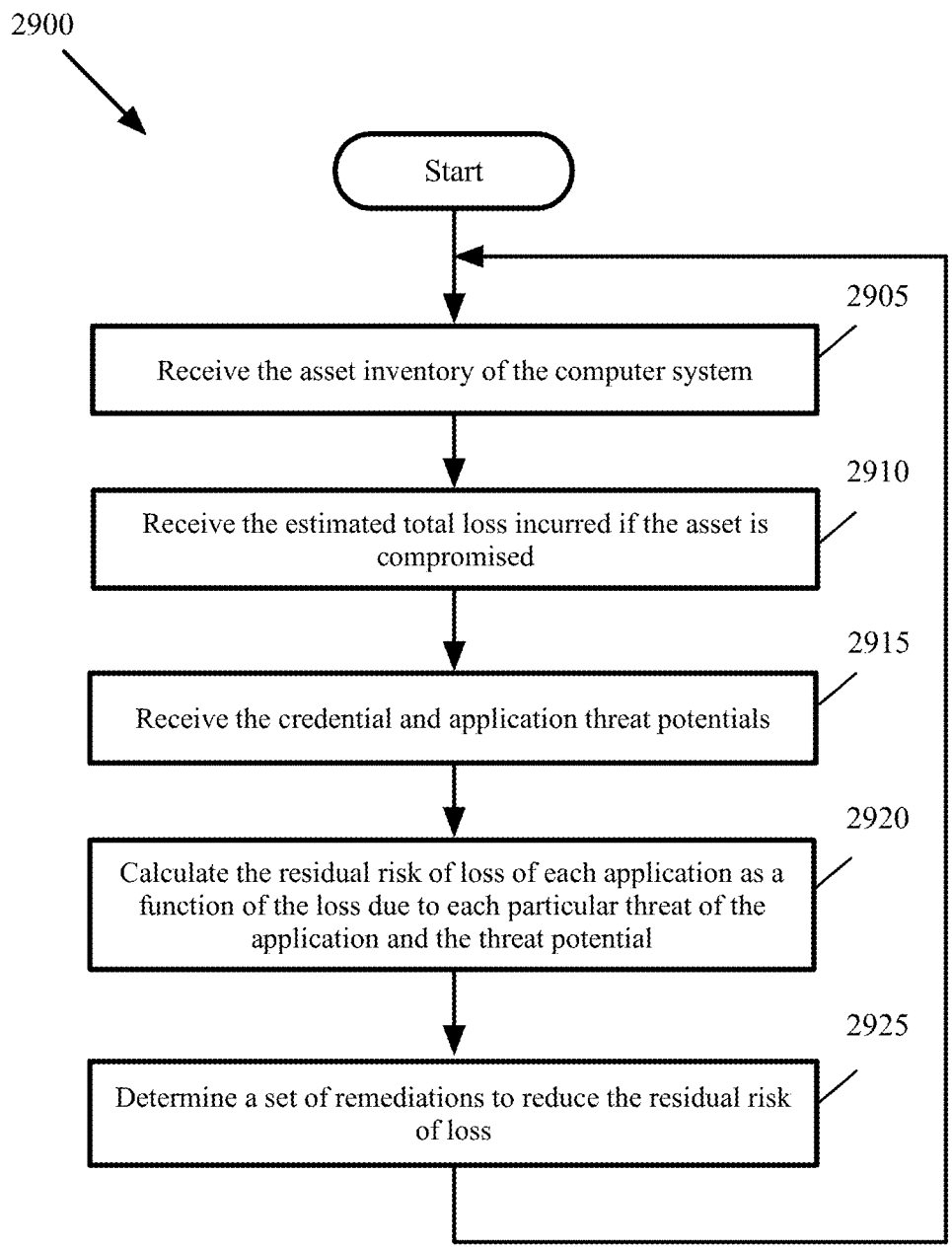
FIG. 29 conceptually illustrates a process for determining the residual risk of loss for applications that execute in a computer system in some embodiments.

FIG. 29 conceptually illustrates a process 2900 for determining the residual risk of loss for applications that execute in a computer system in some embodiments. The process in some embodiments is performed by the residual risk of loss and remediation determination subsystem 2445 shown in FIG. 28.

As shown in FIG. 29, the process receives (at 2905) the asset inventory of the computer system. For instance, application residual risk of loss determination component 2805 in FIG. 28 receives the asset inventory 2450 of the computer system. The asset inventory includes the list of different applications that execute in the computer system.

The process also receives (at 2910) the estimated total (or inherent) loss incurred if the asset were compromised. For instance, application residual risk of loss determination component 2805 receives the estimated total loss of each application should the application be compromised. As an example, the compromise of an application that includes personal information may cause millions of dollars of damage for settlement of lawsuits, loss of reputation, loss of customers, etc.

In some embodiments, the estimated total (or inherent) loss of each application is received through a user interface that provides a discreet set of loss levels to assign to each application. In some embodiments, each loss level is tied to a monetary value (e.g., a value in a currency such as dollars). The inherent risk of each application is then determined by mapping the level of loss associated with the application to the corresponding monetary loss value. In other embodiments, the loss levels are utilized as relative figures to identify the total loss caused by each application.

The process also receives (at 2915) the credential and application threat potentials. For instance, application residual risk of loss determination component 2805 in FIG. 28 receives credential-threat potentials 2715 and application-threat potentials 2720. The process then calculates (at 2920) the residual risk of loss of each application as a function of loss due to each particular credential and application threat. For instance, application residual risk of loss determination component 2805 in FIG. 28 identifies each application in the asset inventory 2450 and calculates the application's residual risk of loss 2465 as a function of the application's total inherent risk 2455, the credential threat potentials 2715, and application's threat potentials 2720.

As described above by reference to process 600, the credential and application threat potentials are calculated based on different criteria used to determine the probability of occurrence of a particular threat. The residual risk of loss in some embodiments is determined as a monetary loss (e.g., a value in a currency such as dollars). In other embodiments, the residual risk of loss is defined as a normalized risk factor.

The process then determines (at 2925) a set of remediations to reduce the residual risk of loss. For instance, the remediation determination component 2810 in FIG. 28 receives the application residual risk of loss 2465 and determines a set of remediation. The process then proceeds to 2905, which was described above.

V. Computer and Electronic System

A. Computer System

FIG. 31 conceptually illustrates an example of a computer system 3100 for which the security risks are identified and mitigated in some embodiments of the invention. Some of the computers, servers, and storage, used by the organization may be located in a datacenter such as datacenter 3105 while other computers, servers, and storage used by the organization may be in one or more client centers 3110 located in different campuses, buildings, or departments.

Datacenters include private datacenters that are managed by the organization that uses the datacenter and third party provided datacenters (such as datacenters built by cloud service providers) that may be used by many different clients that are unknown to each other. A datacenter centralizes an organization's information technology operations, computing equipment, data storage, etc.

In the example of FIG. 31, datacenter 3105 provides several servers 3111-3112. Some of these servers act as a host for one or more data compute nodes (DCNs) 3115-3118. An example of a DCN is a virtual machine (VM) 3115-3116 that can operate with its own guest operating system on a host by using resources of the host that are virtualized by virtualization software (e.g., a hypervisor or a VM monitor) of the host. Another example of a DCN is a container 3117-3118 that runs on top of a host operating system without the need for a hypervisor or separate guest operating system.

Each DCN 3115-3118 is typically connected to a network interface card 3121-3122 through a software switch 3125-3126. The datacenter also includes a set of compute servers 3130 for managing the DCNs and a set of network servers 3135 for managing the computer network that connected different entities inside the datacenter. The datacenter also provides storage (not shown) for different servers and DCNs.

The networked entities in the datacenter are connected to each other through one or more networks such as local area networks (LANs) and overlay networks. An overlay network is a network virtualization technology that achieves multi-tenancy in a computing environment. The networked entities in the datacenter are connected to each other through one or more forwarding elements such as switches or routers 3150. The entities inside the datacenter are connected to an external network 3145 (such as the Internet) or a wide area network (WAN) through one or more gateways 3146-3147 through the firewall 3150.

The computers, servers, and storage used by the organization may also be in one or more client centers 3110. The client center may include servers 3151-3155 and personal computers 3161-3162. Examples of the servers include one or more web servers 3151, application servers 3152, and database servers 3153 (e.g., to implement a multi-tiered enterprise architecture).

The datacenter and client center servers may include one or more other servers. Such servers may provide one or more monitoring or security services. Examples of these services include security threat prevention tools 2510, risk determination tools and processes 2515, and configuration data collection tools 2520 that were described above by reference to FIG. 25.

Security threat prevention tools may include one or more of endpoint protection tools 2525, security information and event management (SEIM) tools 2530, data loss prevention (DLP) tool 2535, cloud access security brokers (CASB) tools 2540, threat intelligence data collection tools 2550, and antivirus software 2555 as shown in FIG. 25. Risk determination tools and processes may include one or more of prevention testing tools 2565 and governance, risk management, and compliance (GRC) tools 2570 as shown in FIG. 25. Configuration data collection tools may include one or more of network configuration data reporting tools 2572, hardware and operating system configuration data reporting tools 2575, and application configuration data reporting tools 2580 as shown in FIG. 25. The computers 3161-3162 and servers 3151-3155 are connected to the external network 3145 through a set of routers and switches 3170, firewall 3175, and gateway 3180.

B. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 32:
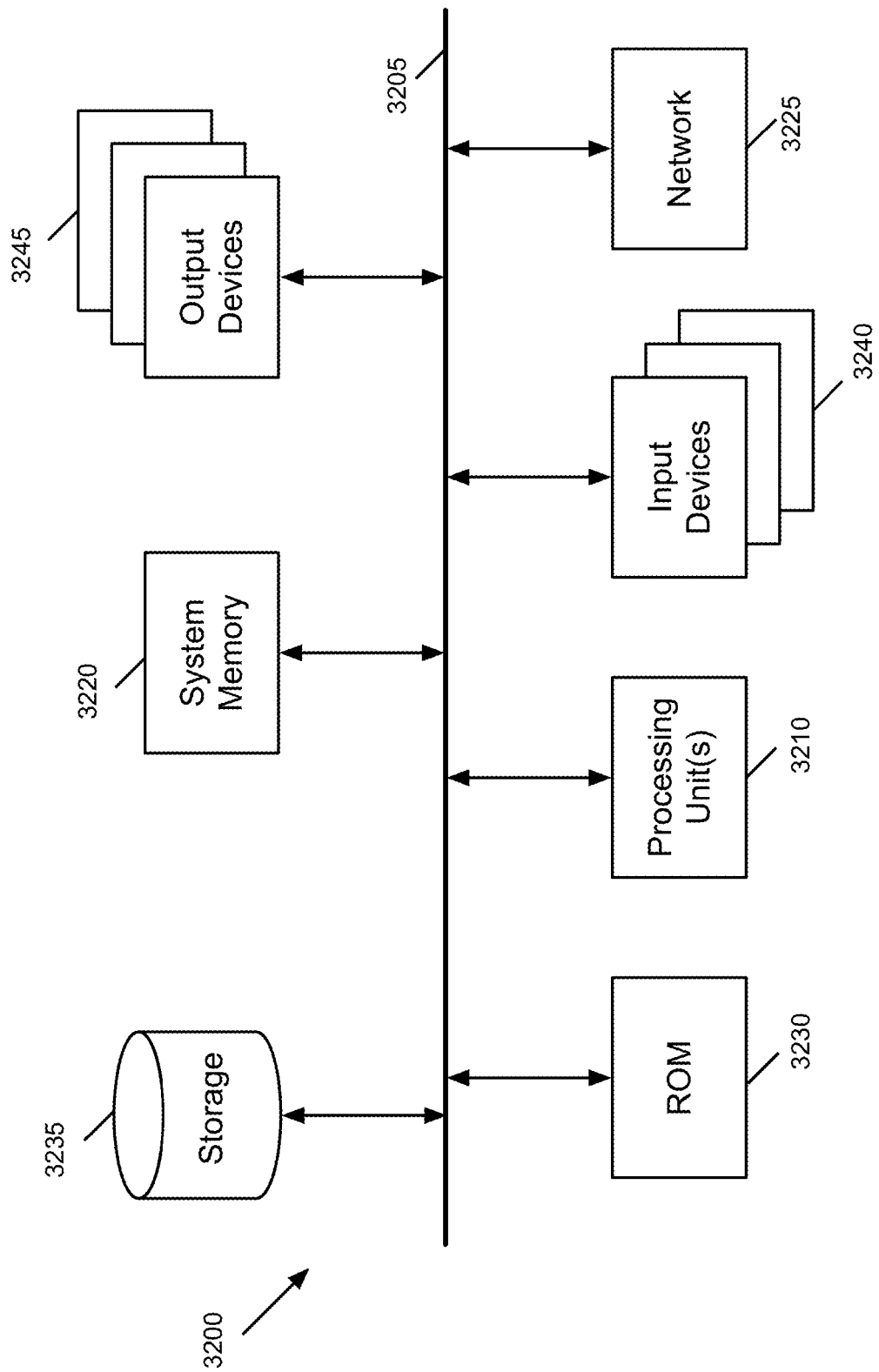

FIG. 32 conceptually illustrates an electronic system 3200 with which some embodiments of the invention are implemented. The electronic system 3200 can be used to execute any of the control, virtualization, or operating system applications described above. The electronic system 3200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3200 includes a bus 3205, processing unit(s) 3210, a system memory 3220, a read-only memory (ROM) 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the read-only memory 3230, the system memory 3220, and the permanent storage device 3235.

From these various memory units, the processing unit(s) 3210 retrieve instructions to execute and data to process in order to execute the processes of the invention. The processing unit(s) may be a single processor or a multi-core processor in different embodiments.

The read-only-memory 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive) as the permanent storage device 3235.

Other embodiments use a removable storage device (such as a floppy disk, flash drive, etc.) as the permanent storage device. Like the permanent storage device 3235, the system memory 3220 is a read-and-write memory device. However, unlike storage device 3235, the system memory is a volatile read-and-write memory, such as random access memory. The system memory stores some of the instructions and data that the processor needs at runtime. In some embodiments, the invention's processes are stored in the system memory 3220, the permanent storage device 3235, and/or the read-only memory 3230. From these various memory units, the processing unit(s) 3210 retrieve instructions to execute and data to process in order to execute the processes of some embodiments.

The bus 3205 also connects to the input and output devices 3240 and 3245. The input devices enable the user to communicate information and select commands to the electronic system. The input devices 3240 include alphanumeric keyboards and pointing devices (also called "cursor control devices"). The output devices 3245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 32, bus 3205 also couples electronic system 3200 to a network 3225 through a network adapter (not shown). In this manner, the computer can be a part of a network of computers (such as a local area network ("LAN"), a wide area network ("WAN"), an Intranet, or a network of networks, such as the Internet). Any or all components of electronic system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6, 9A-9B, 19, 26, and 29) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method of determining a monetary loss due to security risks associated with a plurality of applications executing on a plurality of computers in a computer system, the method comprising:

assigning to each application a set of loss levels from a plurality of loss levels, each loss level in the set of loss levels corresponding to a different type of risk associated to an application;

defining a presentation that identifies a total monetary residual risk of loss due to security risks for the plurality of applications by assigning a monetary value to the set of loss levels assigned to each application;

receiving an adjustment to a loss level for at least one application; and defining a presentation that identifies a revised total monetary residual risk of loss based on the adjustment to said at least one loss level.

2. The method of claim 1 further comprising:

receiving an adjustment to the monetary residual risk of loss for at least one loss level; and defining a presentation that identifies a revised total monetary residual risk of loss based on the adjustment to the monetary residual risk of loss.

3. The method of claim 2, wherein receiving an adjustment to a loss level for an application comprises:

displaying the plurality of loss levels associated with the application; and receiving a selection of a loss level for a particular type of risk associated to the application that is different than a current loss level for the particular type of risk associated with the application.

4. The method of claim 1 further comprising:

directing a set of machine-executable processes to examine an operating environment of a set of applications executing on the plurality of computers to identify security risks in the computer system; and defining a presentation that identifies a revised total monetary residual risk of loss based on the examining of the operating environment.

5. The method of claim 4 further comprising:

receiving an adjustment to the monetary residual risk of loss for at least one loss level based on the security risks identified in the examination of the operating environment; and defining a presentation that identifies a revised total monetary residual risk of loss based on the adjustment to said at least one loss level.

6. The method of claim 1, wherein the residual risk of loss for each application is determined as a function of a loss due to an exploit of the application and a probability of occurrence of the exploit.

7. The method of claim 1, wherein the residual risk of loss for each application is determined by monitoring the application executing on one or more computers in the computer system.

8. The method of claim 1, wherein the value of the monetary residual risk of loss is presented as a currency value.

9. The method of claim 1, wherein the type of risk associated to an application comprises one or more of an inherent risk of loss, a potential effect of loss of confidentiality caused by a threat to the application, a potential effect of loss on integrity caused by a threat to the application, and a potential effect of a loss of availability caused by a threat to the application.

10. A non-transitory machine readable medium storing a program for determining a monetary loss due to security risks associated with a plurality of applications executing on a plurality of computers in a computer system, the program executable by at least one processing unit, the program comprising sets of instructions for:
  assigning to each application a set of loss levels from a plurality of loss levels, each loss level in the set of loss levels corresponding to a different type of risk associated to an application;
  defining a presentation that identifies a total monetary residual risk of loss due to security risks for the plurality of applications by assigning a monetary value to the set of loss levels assigned to each application;
  receiving an adjustment to a loss level for at least one application; and
  defining a presentation that identifies a revised total monetary residual risk of loss based on the adjustment to said at least one loss level.

11. The non-transitory machine readable medium of claim 10, the program further comprising sets of instructions for:
  receiving an adjustment to the monetary residual risk of loss for at least one loss level; and
  defining a presentation that identifies a revised total monetary residual risk of loss based on the adjustment to the monetary residual risk of loss.

12. The non-transitory machine readable medium of claim 11, wherein the set of instructions for receiving an adjustment to a loss level for an application comprises sets of instructions for:
  displaying the plurality of loss levels associated with the application; and
  receiving a selection of a loss level for a particular type of risk associated to the application that is different than a current loss level for the particular type of risk associated with the application.

13. The non-transitory machine readable medium of claim 10, the program further comprising sets of instructions for:
  directing a set of machine-executable processes to examine an operating environment of a set of applications executing on the plurality of computers to identify security risks in the computer system; and
  defining a presentation that identifies a revised total monetary residual risk of loss based on the examining of the operating environment.

14. The non-transitory machine readable medium of claim 13, the program further comprising sets of instructions for:
  receiving an adjustment to the monetary residual risk of loss for at least one loss level based on the security risks identified in the examination of the operating environment; and
  defining a presentation that identifies a revised total monetary residual risk of loss based on the adjustment to said at least one loss level.

15. The non-transitory machine readable medium of claim 10, wherein the residual risk of loss for each application is determined as a function of a loss due to an exploit of the application and a probability of occurrence of the exploit.

16. The non-transitory machine readable medium of claim 10, wherein the residual risk of loss for each application is determined by monitoring the application executing on one or more computers in the computer system.

17. The non-transitory machine readable medium of claim 10, wherein the value of the monetary residual risk of loss is presented as a currency value.

18. The non-transitory machine readable medium of claim 10, wherein the type of risk associated to an application comprises one or more of an inherent risk of loss, a potential effect of loss of confidentiality caused by a threat to the application, a potential effect of loss on integrity caused by a threat to the application, and a potential effect of a loss of availability caused by a threat to the application.

* * * * *